US012476066B2

(12) United States Patent
Mc Carthy

(10) Patent No.: US 12,476,066 B2
(45) Date of Patent: Nov. 18, 2025

(54) INTELLIGENT INTERVENTION ALLOCATION FOR MEDICAL IMAGING SCANNERS

(71) Applicant: GE Precision Healthcare LLC, Waukesha, WI (US)

(72) Inventor: Thomas Mc Carthy, Paris (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 181 days.

(21) Appl. No.: 18/529,277

(22) Filed: Dec. 5, 2023

(65) Prior Publication Data

US 2025/0182996 A1 Jun. 5, 2025

(51) Int. Cl.
*H01J 35/06* (2006.01)

(52) U.S. Cl.
CPC .......... *H01J 35/064* (2019.05); *H01J 35/066* (2019.05)

(58) Field of Classification Search
None
See application file for complete search history.

(56) References Cited

U.S. PATENT DOCUMENTS

| | | | | |
|---|---|---|---|---|
| 5,901,197 | A | 5/1999 | Khutoryansky et al. | |
| 10,524,760 | B2 | 1/2020 | Nagesh | |
| 11,510,306 | B2 | 11/2022 | Ru | |
| 2020/0211699 | A1 | 7/2020 | Nuthi | |
| 2023/0092780 | A1* | 3/2023 | Begelman | G16H 40/20 382/128 |
| 2025/0006356 | A1* | 1/2025 | Koster | G16H 40/60 |
| 2025/0024577 | A1* | 1/2025 | Korst | A61B 6/586 |
| 2025/0057500 | A1* | 2/2025 | Daerr | A61B 6/40 |

FOREIGN PATENT DOCUMENTS

WO 2023078777 A1 5/2023

OTHER PUBLICATIONS

"Help reduce operational disruptions and unplanned maintenance with data driven insights" GE Aviation, https://www.ge.com/digital/sites/default/files/download_assets/flight-analytics-maintenance-insight.pdf, Last Accessed Dec. 5, 2023, 2 pages.
EP application 24212437.8 filed Nov. 12, 2024—extended Search Report issued Apr. 17, 2025; 12 pages.

* cited by examiner

*Primary Examiner* — Hoon K Song
(74) *Attorney, Agent, or Firm* — Amin, Turocy & Watson, LLP

(57) ABSTRACT

Systems/techniques that facilitate intelligent intervention allocation for medical imaging scanners are provided. In various embodiments, a system can access a set of medical imaging interventions that are to be carried out on a plurality of medical imaging scanners. In various aspects, the system can determine, based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners. In various instances, the system can allocate the set of medical imaging interventions among the plurality of medical imaging scanners in accordance with the recommended allocation.

20 Claims, 12 Drawing Sheets

INTELLIGENT INTERVENTION ALLOCATION FOR MEDICAL IMAGING SCANNERS

TECHNICAL FIELD

The subject disclosure relates generally to medical imaging scanners, and more specifically to intelligent intervention allocation for medical imaging scanners.

BACKGROUND

A medical imaging scanner can utilize one or more X-ray tubes, each of which can comprise one or more cathode filaments. How the medical imaging scanner is used can affect how the cathode filaments become depleted or consumed, which can complicate maintenance or servicing of the medical imaging scanner.

Accordingly, systems or techniques that can address one or more of these technical problems can be desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate intelligent intervention allocation for medical imaging scanners are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a set of medical imaging interventions that are to be carried out on a plurality of medical imaging scanners. In various aspects, the computer-executable components can comprise an allocation component that can determine, based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners. In various instances, the computer-executable components can comprise a result component that can allocate the set of medical imaging interventions among the plurality of medical imaging scanners in accordance with the recommended allocation. In various cases, the recommended allocation can indicate that a first medical imaging intervention of the set of medical imaging interventions is to be allocated to a first medical imaging scanner of the plurality of medical imaging scanners, and the result component can instruct the first medical imaging scanner to locally commit or prepare for the first medical imaging intervention.

According to one or more embodiments, a computer-implemented method is provided. In various embodiments, the computer-implemented method can comprise accessing, by a device operatively coupled to a processor, a set of medical imaging interventions that are to be carried out on a plurality of medical imaging scanners. In various aspects, the computer-implemented method can comprise determining, by the device and based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners. In various instances, the computer-implemented method can comprise allocating, by the device, the set of medical imaging interventions among the plurality of medical imaging scanners in accordance with the recommended allocation. In various cases, the recommended allocation can indicate that a first medical imaging intervention of the set of medical imaging interventions is to be allocated to a first medical imaging scanner of the plurality of medical imaging scanners, and the allocating can comprise instructing, by the device, the first medical imaging scanner to locally commit or prepare for the first medical imaging intervention.

According to one or more embodiments, a computer program product for facilitating intelligent intervention allocation for medical imaging scanners is provided. In various embodiments, the computer program product can comprise a non-transitory computer-readable memory having program instructions embodied therewith. In various aspects, the program instructions can be executable by a processor to cause the processor to access a set of medical imaging interventions that are to be carried out on a plurality of medical imaging scanners. In various instances, the program instructions can be further executable to cause the processor to determine, based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners. In various cases, the program instructions can be further executable to cause the processor to allocate the set of medical imaging interventions among the plurality of medical imaging scanners in accordance with the recommended allocation. In various aspects, the recommended allocation can indicate that a first medical imaging intervention of the set of medical imaging interventions is to be allocated to a first medical imaging scanner of the plurality of medical imaging scanners, and the processor can instruct the first medical imaging scanner to locally commit or prepare for the first medical imaging intervention.

DETAILED DESCRIPTION

Figure 1:
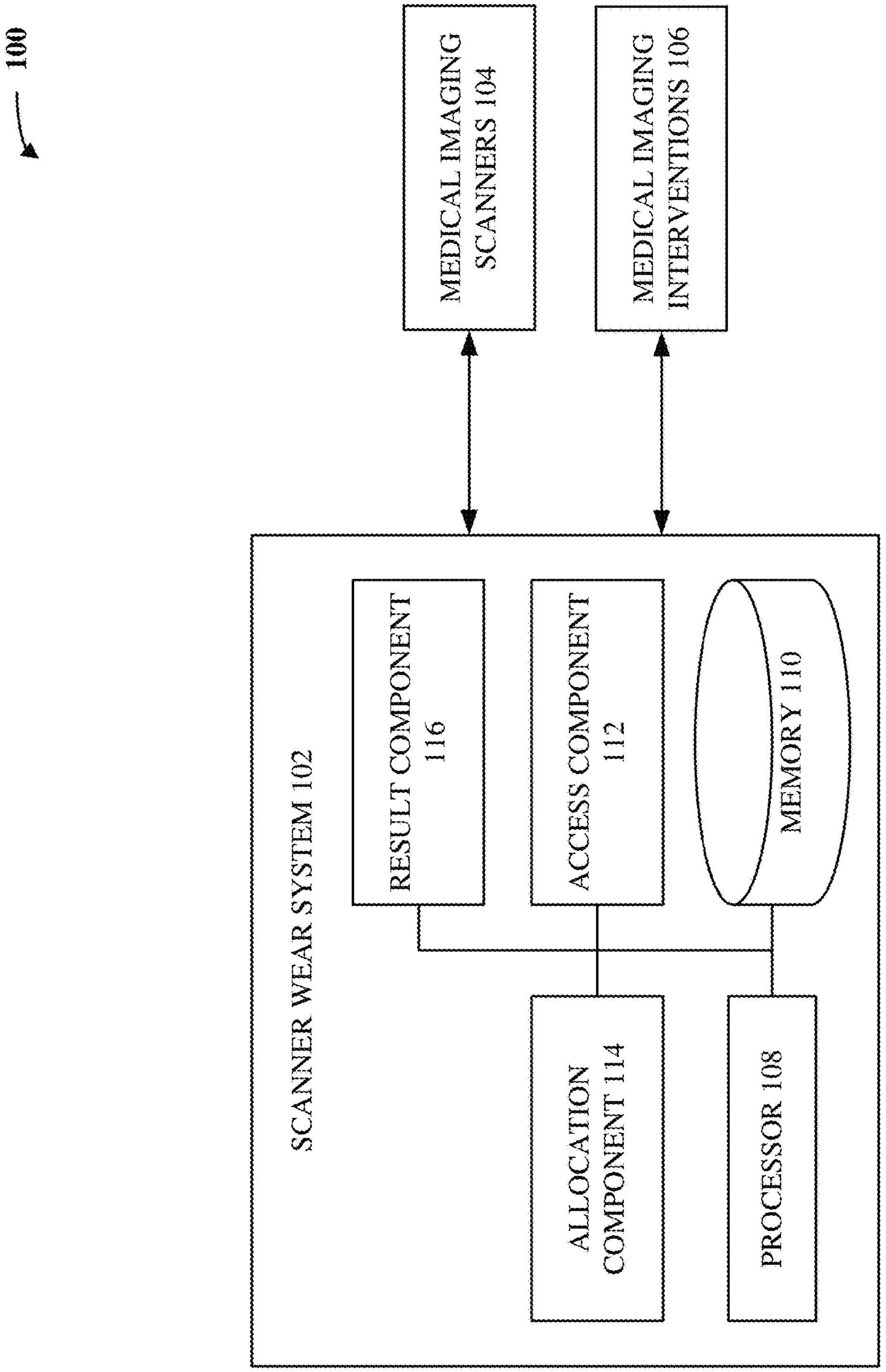
FIG. 1 illustrates a block diagram of an example, non-limiting system that facilitates intelligent intervention allocation for medical imaging scanners in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A medical imaging scanner (e.g., an X-ray scanner, a computed tomography (CT) scanner, a positron emission tomography (PET) scanner) can utilize one or more X-ray tubes (e.g., stationary or Coolidge X-ray tubes, rotating X-ray tubes, microfocus X-ray tubes) to generate medical images. In particular, a medical patient can be positioned on a table or within a gantry of the medical imaging scanner; the medical imaging scanner can emit radiation beams from the one or more X-ray tubes; such radiation beams can pass through the medical patient and thus become altered (e.g., different anatomical structures in the medical patient's body can absorb or pass different or respective amounts, amplitudes, or wavelengths of radiation); and one or more detectors (e.g., photographic plate detectors, photographic film detectors) can capture those altered radiation beams, thereby yielding a medical image of the medical patient (e.g., in some cases, the detectors can capture sinograms, and such sinograms can be reconstructed, such as via filtered back projection, into the medical image).

An X-ray tube can comprise or otherwise rely upon one or more cathode filaments (e.g., tungsten filaments). In particular, electric current can be passed through such one or more cathode filaments, so as to create one or more electron streams that impact a target (e.g., tungsten target) of the X-ray tube, where the target can be affixed to an anode of the X-ray tube. Such impacts between the one or more electron streams and the target can cause radiation beams to be emitted from the target. The inventors of various embodiments described herein recognized that, depending upon how often or how intensely the medical imaging scanner is used, the cathode filaments can become unevenly depleted or consumed, which can complicate maintenance or servicing of the medical imaging scanner.

As a non-limiting example, when at least one cathode filament of an X-ray tube is depleted, that X-ray tube can be considered as having reached the end of its useful life, thereby warranting replacement (e.g., although that X-ray tube can technically still be utilized even with a depleted cathode filament, the post-depletion performance of that X-ray tube can be significantly degraded). However, if fewer than all of the cathode filaments in that X-ray tube are depleted when the X-ray tube reaches the end of its useful life, replacement of that X-ray tube can be considered as being at least partially wasteful (e.g., any non-depleted cathode filaments of that X-ray tube are being thrown out with the at least one depleted cathode filament).

As another non-limiting example, when a medical imaging scanner utilizes multiple X-ray tubes, individual ones of such multiple X-ray tubes can be separately replaced as they individually reach the end of their useful lives. However, if such multiple X-ray tubes reach the end of their useful lives at different or staggered times, this can necessitate multiple, staggered servicing visits to the medical imaging scanner, which can be considered as time-consuming or inconvenient.

Such maintenance or servicing complications can be compounded in situations where an entire fleet of medical imaging scanners is involved. For example, a hospital network can manage tens, hundreds, or even thousands of medical imaging scanners, and problems can be encountered when multiple scanners require maintenance at the same time (e.g., excessive or widespread scanner downtime can ensue; increased travel or inconvenience for service crews can ensue).

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate intelligent intervention allocation for medical imaging scanners. In particular, when given a list of medical imaging interventions that are to be implemented on a fleet of medical imaging scanners, various embodiments described herein can include determining how to allocate such list of medical imaging interventions among the fleet of medical imaging scanners, so as to reduce cathode filament waste or so as to increase convenience of servicing the fleet of medical imaging scanners, hence the term "intelligent." Various embodiments described herein can facilitate such intelligent allocation by leveraging digital scanner twins that respectively model cathode filament wear accumulations of the fleet of medical imaging scanners. In some cases, various embodiments can involve an optimization engine simulating multiple (e.g., all possible) intervention allocations on the digital scanner twins, so as to identify which specific intervention allocation satisfies any suitable optimization criterion, where the optimization criterion can serve as a proxy for reduced cathode filament waste or increased scanner servicing convenience (e.g., the optimization criterion can be minimization of cathode filament wear discrepancies within each medical imaging scanner of the fleet; the optimization criterion can be maximization of cathode filament wear discrepancies between different medical imaging scanners of the fleet; the optimization criterion can be minimization of cathode filament wear discrepancies between different medical imaging scanners of the fleet that are in a same physical location as each other). In other cases, various embodiments can involve utilizing a deep learning neural network which can receive as input the list of medical imaging interventions and which can also receive as input present-time cathode filament wear states indicated by the digital scanner twins, and which can determine as output an intervention allocation that reduces cathode filament waste or that increases scanner servicing convenience. In any case, the present inventors realized that different medical imaging interventions can cause different incremental increases in cathode filament wear to different medical imaging scanners. Accordingly, various embodiments described herein can involve leveraging digital scanner twins respectively corresponding to the fleet of medical imaging scanners, so as to identify how to wisely or beneficially allocate medical imaging interventions among the fleet of medical imaging scanners.

Various embodiments described herein can be considered as a computerized tool (e.g., any suitable combination of computer-executable hardware or computer-executable software) that can facilitate intelligent intervention allocation for medical imaging scanners. In various aspects, such computerized tool can comprise an access component, an allocation component, or a result component.

In various embodiments, there can be a plurality of medical imaging scanners. In various aspects, each of the plurality of medical imaging scanners can be any suitable medical imaging scanner that can capture or generate medical scanned images via one or more X-ray tubes, with each X-ray tube comprising one or more cathode filaments (e.g., any of the plurality of medical imaging scanners can be X-ray scanners, CT scanners, or PET scanners). In various instances, different ones of the plurality of medical imaging scanners can be deployed or positioned in the same or different physical locations as each other (e.g., different medical imaging scanners can be located in the same hospital building or hospital room as each other; different medical imaging scanners can be located in different hospital buildings or hospital rooms as each other).

In various embodiments, there can be a set of medical imaging interventions. In various aspects, each of the set of medical imaging interventions can be a respective scanning protocol or scanning procedure that is or has been ordered for a respective medical patient and that is to be carried out on any of the plurality of medical imaging scanners.

In various instances, it can be desired to determine how to allocate the set of medical imaging interventions among the plurality of medical imaging scanners, so as to reduce cathode filament waste associated with the plurality of medical imaging scanners, or so as to increase maintenance convenience associated with the plurality of medical imaging scanners. As described herein, the computerized tool can facilitate such determination.

In various embodiments, the access component of the computerized tool can electronically access the plurality of medical imaging scanners or the set of medical imaging interventions. In particular, in various aspects, the access component can electronically communicate with (e.g., transmit electronic data to, receive electronic data from) the plurality of medical imaging scanners. Furthermore, in various instances, the access component can electronically receive, retrieve, or obtain the set of medical imaging interventions from any suitable centralized or decentralized data structures (e.g., graph data structures, relational data structures, hybrid data structures), whether remote from or local to the access component. In any case, the access component can electronically access the plurality of medical imaging scanners or the set of medical imaging interventions, such that the access component can serve as a conduit through which or by which other components of the computerized tool can electronically interact with (e.g., read, write, edit, copy, manipulate, control) the plurality of medical imaging scanners or the set of medical imaging interventions.

In various embodiments, the allocation component of the computerized tool can electronically store, maintain, control, or otherwise access a plurality of digital scanner twins that respectively correspond to the plurality of medical imaging scanners. In various aspects, a digital scanner twin can be considered as a virtual counterpart of a respective medical imaging scanner that can be leveraged for virtualized simulation or testing. In various instances, the allocation component can electronically determine how the set of medical imaging interventions should be allocated among the plurality of medical imaging scanners, by leveraging the plurality of digital scanner twins.

More specifically, each digital scanner twin can correspond to a respective medical imaging scanner, such that the digital scanner twin can comprise a respective cathode filament wear model for each cathode filament of that medical imaging scanner. In various aspects, a cathode filament wear model can be any suitable computational or analytical physics-based model (e.g., utilizing energy balance equations, heat transfer equations, electric charge conservation equations) that can represent an amount of accumulated wear, degradation, or depletion that has been experienced so far by a respective cathode filament. In various instances, a cathode filament wear model can be based on (e.g., can utilize as coefficients) any suitable properties of its respective cathode filament (e.g., material composition, electrical resistance, thermal conductivity, heat capacity, thickness, coil length). In various cases, a cathode filament wear model can further be based on (e.g., can take as arguments) any suitable operational input parameters experienced by its respective cathode filament (e.g., magnitude of applied electric current; magnitude of applied electric voltage; time spent being electrified). Note that the properties of a cathode filament can be considered as constants and that the operational input parameters of the cathode filament can instead be considered as variables. Indeed, the operational input parameters of a cathode filament can depend upon or otherwise vary with whatever medical imaging interventions that cathode filament is used to implement (e.g., different scanning protocols can involve applying different electric currents or voltages to the cathode filament for different spans of time; different medical patient sizes or body mass indexes can necessitate applying different electric currents or voltages to the cathode filament for different spans of time; different medical patient pathologies or health statuses can necessitate applying different electric currents or voltages to the cathode filament for different spans of time).

In any case, the allocation component can determine how to wisely or beneficially allocate the set of medical imaging interventions among the plurality of medical imaging scanners, by leveraging the plurality of digital scanner twins.

In various embodiments, the allocation component can facilitate such allocation determination by utilizing an optimizer engine. In various instances, the optimizer engine can be any suitable computational or software-based platform (e.g., CPLEX® optimizer) that can adjust, perturb, change, or otherwise manipulate operational input parameters of any cathode filament wear models in the plurality of digital scanner twins (e.g., can input new electric current values, new electric voltage values, or new electrification times into any cathode filament wear model). By altering operational input parameters of the cathode filament wear models, the optimizer engine can be considered as being able to electronically simulate how any given medical imaging intervention would affect the wear accumulated by the cathode filaments of any given medical imaging scanner. In other words, the optimizer engine can determine how much incremental wear the cathode filaments of that given medical imaging scanner would experience if that given medical imaging intervention were performed on that given medical imaging scanner. Thus, for any given allocation of the set of medical imaging interventions among the plurality of medical imaging scanners, the optimizer engine can electronically simulate on the plurality of digital scanner twins how that given allocation would affect the cathode filament wear profiles of the plurality of medical imaging scanners. Therefore, in various aspects, the optimizer engine can identify multiple different (e.g., all possible) ways of allocating the set of medical imaging interventions among the plurality of medical imaging scanners, the optimizer engine can determine how each of those multiple different allocations would influence the cathode filament wear profiles of the plurality of medical imaging scanners, and the optimizer engine can select whichever of those multiple different allocations whose cathode filament wear profiles best satisfy any suitable optimization criterion.

As a non-limiting example, the optimization criterion can be minimization of an aggregate intra-scanner filament wear discrepancy exhibited by the plurality of digital scanner twins. In particular, as mentioned above, each cathode filament wear model of the plurality of digital scanner twins can be considered as modeling, tracking, or otherwise outputting as a dependent variable a total amount of wear accumulated by a respective cathode filament (e.g., accumulated since that respective cathode filament was new or was installed). In various aspects, an intra-scanner cathode filament wear discrepancy can be an absolute value of a difference between the total accumulated wears of any two cathode filaments that belong to the same medical imaging scanner as each other. In various instances, for each of the plurality of medical imaging scanners that possesses two or more cathode filaments, at least one respective intra-scanner cathode filament wear discrepancy can be computed (e.g., a respective discrepancy for each unique pair of cathode filaments that belong to the same scanner as each other). Accordingly, for any given allocation of the set of medical imaging interventions among the plurality of medical imaging scanners, the optimizer engine can compute various intra-scanner cathode filament wear discrepancies. In various cases, the optimizer engine can aggregate (e.g., via summation, via averaging, via multiplication) such various intra-scanner cathode filament wear discrepancies together, thereby yielding an aggregate intra-scanner cathode filament wear discrepancy. So, for each of the multiple different intervention allocations that are identified by the optimizer engine, the optimizer engine can compute a respective aggregate intra-scanner cathode filament wear discrepancy. In various instances, whichever of those multiple different intervention allocations has a lowest or minimized aggregate intra-scanner cathode filament wear discrepancy can be considered as the allocation that would most wisely or beneficially balance cathode filament wear across the plurality of medical imaging scanners. Indeed, such allocation can be considered as achieving a lowest total or overall amount of cathode filament waste within each individual one of the plurality of medical imaging scanners. In other words, such allocation can be considered as reducing or minimizing instances where any single X-ray tube has reached the end of its useful life while one or more of its cathode filaments are nevertheless far from being depleted. Such allocation can also be considered as being most convenient from a maintenance perspective. That is, such allocation can be considered as reducing or minimizing instances in which the different X-ray tubes of any single medical imaging scanner reach the end of their useful lives at starkly different or staggered times.

As another non-limiting example, the optimization criterion can be maximization of an aggregate inter-scanner cathode filament wear discrepancy exhibited by the plurality of digital scanner twins. In particular, as mentioned above, each cathode filament wear model of the plurality of digital scanner twins can be considered as modeling, tracking, or otherwise outputting as a dependent variable a total amount of wear accumulated by a respective cathode filament. In various aspects, the wears indicated by the cathode filament wear models of a single medical imaging scanner can be aggregated, thereby yielding a scanner-wise cathode filament wear total for that single medical imaging scanner. Accordingly, after simulating any given medical imaging intervention on the digital scanner twin of any given medical imaging scanner, the optimizer engine can compute a scanner-wise cathode filament wear discrepancy for that given medical imaging scanner. So, for any given allocation of the set of medical imaging interventions among the plurality of medical imaging scanners, the optimizer engine can compute a respective scanner-wise cathode filament wear total for each of the plurality of medical imaging scanners. Now, in various instances, an inter-scanner cathode filament wear discrepancy can be an absolute value of a difference between the scanner-wise cathode filament wear totals of any two medical imaging scanners. In various cases, the optimizer engine can compute a respective inter-scanner cathode filament wear discrepancy between each unique pair of the plurality of medical imaging scanners, and the optimizer engine can aggregate all of such inter-scanner cathode filament wear discrepancies together, thereby yielding an aggregate inter-scanner cathode filament wear discrepancy. Accordingly, for each of the multiple different intervention allocations that are identified by the optimizer engine, the optimizer engine can compute a respective aggregate inter-scanner cathode filament wear discrepancy. In various instances, whichever of those multiple different intervention allocations has a highest or maximized aggregate inter-scanner cathode filament wear discrepancy can be considered as the allocation that would most wisely or beneficially distribute cathode filament wear across the plurality of medical imaging scanners. Indeed, such allocation can be considered as achieving a most evenly-spaced amount of staggering between the scanner-wise cathode filament wear totals of the plurality of medical imaging scanners. In other words, such allocation can be considered as reducing or minimizing instances where multiple medical imaging scanners require maintenance or servicing simultaneously, thereby avoiding widespread scanner downtime.

As even another non-limiting example, the optimization criterion can be minimization of an aggregate intra-location filament wear discrepancy exhibited by the plurality of digital scanner twins. In particular, as mentioned above, for any given allocation of the set of medical imaging interventions among the plurality of medical imaging scanners, the optimizer engine can compute a respective scanner-wise cathode filament wear total for each of the plurality of medical imaging scanners. Now, in various instances, some medical imaging scanners can be in the same physical location as each other (e.g., in the same hospital room, in the same hospital building). In various cases, an intra-location cathode filament wear discrepancy can be an absolute value of a difference between the scanner-wise cathode filament wear totals of any two medical imaging scanners that are deployed at the same physical location as each other. In various aspects, the optimizer engine can aggregate the intra-location cathode filament wear discrepancies across all of the plurality of medical imaging scanners, thereby yielding an aggregate intra-location cathode filament wear discrepancy. Accordingly, for each of the multiple different intervention allocations that are identified by the optimizer engine, the optimizer engine can compute a respective aggregate intra-location cathode filament wear discrepancy. In various instances, whichever of those multiple different intervention allocations has a lowest or minimized aggregate intra-location cathode filament wear discrepancy can be considered as the allocation that would most wisely or beneficially distribute cathode filament wear across the plurality of medical imaging scanners. Indeed, such allocation can be considered as conveniently synchronizing cathode filament wear such that any medical imaging scanners in the same physical location as each other are likely to warrant maintenance at the same or similar times. In other words, such allocation can be considered as increasing or maximizing instances where multiple medical imaging scanners at the same physical location as each other are ready for maintenance or servicing simultaneously.

In other embodiments, rather than utilizing the optimizer engine, the allocation component can facilitate such allocation determination by utilizing a deep learning neural network. In particular, the allocation component can electronically store, maintain, control, or otherwise access the deep learning neural network. In various aspects, the deep learning neural network can exhibit any suitable deep learning internal architecture. For example, the deep learning neural network can include any suitable numbers of any suitable types of layers (e.g., input layer, one or more hidden layers, output layer, any of which can be convolutional layers, dense layers, non-linearity layers, pooling layers, batch normalization layers, long short-term memory (LSTM) layers, or padding layers). As another example, the deep learning neural network can include any suitable numbers of neurons in various layers (e.g., different layers can have the same or different numbers of neurons as each other). As yet another example, the deep learning neural network can include any suitable activation functions (e.g., softmax, sigmoid, hyperbolic tangent, rectified linear unit) in various neurons (e.g., different neurons can have the same or different activation functions as each other). As still another example, the deep learning neural network can include any suitable interneuron connections or interlayer connections (e.g., forward connections, skip connections, recurrent connections).

Regardless of its internal architecture, the deep learning neural network can be configured to determine how to allocate inputted medical imaging interventions across inputted medical imaging scanners. Accordingly, the allocation component can determine how to wisely or beneficially allocate the set of medical imaging interventions among the plurality of medical imaging scanners, by executing the deep learning neural network.

More specifically, and as mentioned above, each cathode filament wear model of the plurality of digital scanner twins can be considered as modeling, tracking, or otherwise outputting as a dependent variable a total amount of wear accumulated by a respective cathode filament. In various cases, the total amount of accumulated wear of any given cathode filament prior to simulation or actual implementation of the set of medical imaging interventions can be referred to as a present-time wear state of that given cathode filament. Accordingly, in various aspects, all of the accumulated cathode filament wears presently or currently indicated by the plurality of digital scanner twins can be collectively referred to as a plurality of present-time cathode filament wear states. In various instances, the allocation component can execute the deep learning neural network on both the plurality of present-time cathode filament wear states and on the set of medical imaging interventions, and such execution can cause the deep learning neural network to determine a wise or beneficial intervention allocation (e.g., to determine an allocation that reduces or minimizes cathode filament waste or that otherwise increases or maximizes scanner servicing convenience). In particular, the allocation component can concatenate the set of medical imaging interventions and the plurality of present-time cathode filament wear states together, and the allocation component can feed that concatenation to an input layer of the deep learning neural network. In various cases, that concatenation can complete a forward pass through one or more hidden layers of the deep learning neural network. In various aspects, an output layer of the deep learning neural network can calculate the wise or beneficial intervention allocation, based on activation maps provided by the one or more hidden layers of the deep learning neural network.

In order for the deep learning neural network to reliably or confidently determine such wise or beneficial intervention allocation, the deep learning neural network should first undergo training. In various aspects, as described herein, the deep learning neural network can be trained via any suitable training paradigm (e.g., supervised training using ground-truth intervention allocations, unsupervised training in the absence of ground-truth intervention allocations, reinforcement learning via reward or punishment policies).

In any case, the allocation component can leverage the plurality of digital scanner twins, so as to determine how the set of medical imaging interventions should be allocated among the plurality of medical imaging scanners, so as to reduce cathode filament waste or increase scanner servicing convenience.

In various embodiments, the result component of the computerized tool can initiate or facilitate any suitable electronic actions based on the intervention allocation determined or selected by the allocation component. In some cases, the result component can electronically render that determined or selected intervention allocation on any suitable computer screen or monitor. In other cases, the result component can electronically transmit that determined or selected intervention allocation to any suitable computing device. In yet other cases, the result component can electronically instruct the plurality of medical imaging scanners to prepare for implementation of that determined or selected allocation (e.g., can command each scanner to locally commit the scanning protocol of whatever intervention is assigned to it according to that determined or selected allocation).

Various embodiments described herein can be employed to use hardware or software to solve problems that are highly technical in nature (e.g., to facilitate intelligent intervention allocation for medical imaging scanners), that are not abstract and that cannot be performed as a set of mental acts by a human. Further, some of the processes performed can be performed by a specialized computer (e.g., digital twins comprising computational or analytical cathode filament wear models; a deep learning neural network having internal parameters such as convolutional kernels or long short-term memory layers) for carrying out defined acts related to medical imaging scanners.

For example, such defined acts can include: accessing, by a device operatively coupled to a processor, a set of medical imaging interventions that are to be carried out on a plurality of medical imaging scanners; determining, by the device and based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners; and allocating, by the device, the set of medical imaging interventions among the plurality of medical imaging scanners in accordance with the recommended allocation, wherein the recommended allocation indicates that a first medical imaging intervention of the set of medical imaging interventions is to be allocated to a first medical imaging scanner of the plurality of medical imaging scanners, and wherein the allocating comprises instructing, by the device, the first medical imaging scanner to locally commit or prepare for the first medical imaging intervention. In some instances, the device can simulate, on the plurality of digital scanner twins, multiple different allocations of the set of medical imaging interventions among the plurality of medical imaging scanners, and the recommended allocation can be whichever of those multiple different allocations causes minimization or maximization of an optimization criterion (e.g., minimization of an aggregate intra-scanner cathode filament wear discrepancy indicated by the plurality of digital scanner twins; maximization of an aggregate inter-scanner cathode filament wear discrepancy indicated by the plurality of digital scanner twins; minimization of an aggregate intra-location cathode filament wear discrepancy indicated by the plurality of digital scanner twins). In other instances, the device can determine the recommended allocation, by executing a machine learning model (e.g., a deep learning neural network) on the set of medical imaging interventions and on present-time cathode filament wear states indicated by the plurality of digital scanner twins.

Such defined acts are not performed manually by humans. Indeed, neither the human mind nor a human with pen and paper can electronically utilize, in conjunction with an optimizer engine or a deep learning neural network, digital twins that model or simulate cathode filament degradation experienced by a fleet of medical imaging scanners to identify how best to allocate a slate of planned medical imaging interventions among the fleet of medical imaging scanners. Indeed, cathode filaments are concrete, tangible constituent parts of medical imaging scanners that simply cannot be meaningfully implemented in any way by the human mind without computers. Additionally, digital twins are inherently-computerized virtualizations that also cannot be meaningfully implemented in any way by the human mind without computers. Furthermore, deep learning neural networks and optimizer engines are inherently-computerized constructs that similarly cannot be meaningfully executed or trained in any way by the human mind without computers. In other words, the human mind, even with the assistance of pen and paper, simply cannot simulate or analyze cathode filament wear profiles by using digital scanner twins in combination with an optimizer engine or a deep learning neural network. Accordingly, a computerized tool that can recommend or suggest how to allocate medical imaging interventions among medical imaging scanners, by leveraging, in conjunction with an optimizer engine or a deep learning neural network, digital scanner twins that model cathode filament wears accumulated by the medical imaging scanners is inherently-computerized and cannot be implemented in any sensible, practical, or reasonable way without computers.

Moreover, various embodiments described herein can integrate into a practical application various teachings relating to intelligent intervention allocation for medical imaging scanners. As explained above, how often or how intensely a medical imaging scanner is used can affect the wear and tear experienced by the X-ray tube cathode filaments of the medical imaging scanner. If medical imaging interventions are performed on the medical imaging scanner in a random, haphazard, or otherwise unthoughtful order or sequence, the cathode filament wears accumulated by that medical imaging scanner can cause undesirable waste or servicing inconvenience.

For example, an X-ray tube of the medical imaging scanner can reach the end of its useful life when at least one of its cathode filaments is depleted (e.g., when at least one of its cathode filaments has achieved a threshold level of accumulated wear). However, if one or more other cathode filaments of that X-ray tube are not yet depleted (e.g., have not yet reached that threshold level of accumulated wear), then replacement of the X-ray tube can be considered as being necessary but wasteful (e.g., necessary to maintain proper performance of the X-ray tube, but wasteful since the one or more other cathode filaments are being thrown out despite not being depleted). For instance, suppose that the X-ray tube possesses a cathode filament A and a cathode filament B. Moreover, suppose that the cathode filament A has been depleted, and further suppose that the cathode filament B can still accumulate a significant amount of wear before becoming depleted. In such case, the depletion of the cathode filament A can warrant replacement of the X-ray tube. But replacement of the X-ray tube can be considered as wasting the significant non-depleted portion of the cathode filament B. In other words, it would be much less wasteful if, at the time that the cathode filament A becomes depleted, the cathode filament B also were to become depleted or were at least much closer to depletion.

As another example, the medical imaging scanner can have multiple X-ray tubes. If such multiple X-ray tubes reach the end of their useful lives at significantly different or staggered times, then maintenance of the medical imaging scanner can be rendered inefficient or cumbersome. For instance, suppose that the medical imaging scanner possesses an X-ray tube C and an X-ray tube D. Moreover, suppose that the X-ray tube C has reached the end of its useful life, while the X-ray tube D still has a significant amount of its useful life remaining. In such case, a first service visit can be made to the medical imaging scanner to replace the X-ray tube C. After such replacement, however, it can be the case that the X-ray tube D eventually reaches the end of its useful life while the post-replacement X-ray tube C still has a significant amount of its useful life remaining. In such case, a second service visit can be made to the medical imaging scanner to replace the X-ray tube D. In this way, the number of service visits made to the medical imaging scanner can be considered as being unnecessarily increased. In other words, it would be much less time-consuming or much more convenient if, at the time that the X-ray tube C reaches the end of its useful life, the X-ray tube D were to also reach the end of its useful life or were at least much closer to the end of its useful life, so that the X-ray tube C and the X-ray tube D could be replaced during the same service visit as each other.

As even another example, there can be a fleet of medical imaging scanners. If all or many of such fleet of medical imaging scanners require maintenance at the same time as each other, then much of the fleet would be down or offline simultaneously and unable to perform medical imaging interventions. For instance, suppose that the fleet includes only the medical imaging scanner E and the medical imaging scanner F. Furthermore, suppose that the medical imaging scanner E warrants a service visit (e.g., to replace X-ray tubes) at the same time that the medical imaging scanner F warrants a service visit. In such case, the medical imaging scanner E and the medical imaging scanner F can be considered as being down or offline at the same time, which means that the fleet can be unable to handle any required or desired medical imaging interventions during such downtime. Instead, it would be more beneficial if the medical imaging scanner E and the medical imaging scanner F warranted service at different or staggered times. That way, situations in which no scanner is online can be avoided or reduced.

As yet another example, a fleet of medical imaging scanners can include some scanners that are physically located at a same site as each other. If such same-site scanners require servicing at significantly different or staggered times, then maintenance of such same-site scanners can be rendered inefficient or cumbersome. For instance, suppose that the medical imaging scanner G and the medical imaging scanner H are located in the same hospital building as each other. Moreover, suppose that the medical imaging scanner G warrants maintenance (e.g., to replace X-ray tubes), while the medical imaging scanner H still has a significant amount of time or usage remaining before warranting maintenance. In such case, a first service visit can be made to the hospital building to service the medical imaging scanner G. After such maintenance, however, it can be the case that the medical imaging scanner H eventually warrants maintenance while the post-service medical imaging scanner G has a significant amount of time or usage remaining before again warranting maintenance. In such case, a second service visit can be made to the hospital building to service the medical imaging scanner H. In this way, the number of service visits made to the hospital building can be considered as being unnecessarily increased. In other words, it would be much less time-consuming or much more convenient if, at the time that the medical imaging scanner G warrants maintenance, the medical imaging scanner H were to also warrant maintenance or were at least much closer to warranting maintenance, so that the medical imaging scanner G and the medical imaging scanner H can be serviced during the same service visit as each other.

Accordingly, how cathode filament wear or degradation is accumulated by medical imaging scanners can cause undesirable waste or servicing inconvenience.

Various embodiments described herein can address or ameliorate such technical problems. Specifically, various embodiments described herein can involve determining how medical imaging interventions should be allocated among a fleet of medical imaging scanners, by leveraging digital scanner twins respectively corresponding to the fleet of medical imaging scanners. In various aspects, each digital scanner twin can computationally or analytically model the cathode filament wears accumulated by a respective medical imaging scanner. In various instances, such accumulated cathode filament wears can be utilized, either by an optimizer engine or a deep learning neural network, to determine how to intelligently, wisely, or otherwise beneficially allocate medical imaging interventions among the fleet of the medical imaging scanners. In various aspects, such intelligent, wise, or beneficial allocation can be configured to minimize or maximize any suitable optimization criterion. In some cases, such optimization criterion can be minimization of intra-scanner cathode filament wear discrepancies; this can be considered as reducing or minimizing situations in which non-depleted cathode filaments are wasted, or can be considered as reducing or minimizing situations in which multiple X-ray tubes of a single medical imaging scanner reach the ends of their useful lives in staggered fashion. In other cases, such optimization criterion can be maximization of inter-scanner cathode filament wear discrepancies; this can be considered as reducing or minimizing situations in which very many medical imaging scanners of a fleet warrant maintenance at the same time as each other (e.g., reducing or minimizing mass or widespread scanner downtime). In even other cases, such optimization criterion can be minimization of intra-location cathode filament wear discrepancies; this can be considered as reducing or minimizing situations in which multiple medical imaging scanners located at the same physical site as each other warrant maintenance in staggered fashion. Accordingly, various embodiments described herein can be considered as intelligently or cleverly determining which specific medical imaging interventions to perform on which specific medical imaging scanners, so as to reduce cathode filament waste or to increase convenience of medical imaging scanner maintenance. For at least these reasons, various embodiments described herein certainly constitute concrete and tangible technical improvements or technical advantages in the field of medical imaging scanners, and such embodiments therefore clearly qualify as useful and practical applications of computers.

Furthermore, various embodiments described herein can control real-world tangible devices based on the disclosed teachings. For example, various embodiments described herein can electronically command real-world medical imaging scanners (e.g., X-ray scanners, CT scanners, PET scanners) to commit or perform real-world medical imaging interventions on real-world medical patients (e.g., humans, animals, or otherwise).

It should be appreciated that the herein figures and description provide non-limiting examples of various embodiments and are not necessarily drawn to scale.

FIG. 1 illustrates a block diagram of an example, non-limiting system 100 that can facilitate intelligent intervention allocation for medical imaging scanners in accordance with one or more embodiments described herein. As shown, a scanner wear system 102 can be electronically integrated, via any suitable wired or wireless electronic connections, with a plurality of medical imaging scanners 104 and with a set of medical imaging interventions 106.

In various aspects, the plurality of medical imaging scanners 104 can comprise any suitable number of any suitable types of medical imaging scanners. In various instances, the set of medical imaging interventions 106 can comprise any suitable number of medical imaging interventions, each of which can be implemented, performed, or otherwise executed on or by any of the plurality of medical imaging scanners 104. Various non-limiting aspects are described with respect to FIGS. 2-3.

Figure 2:
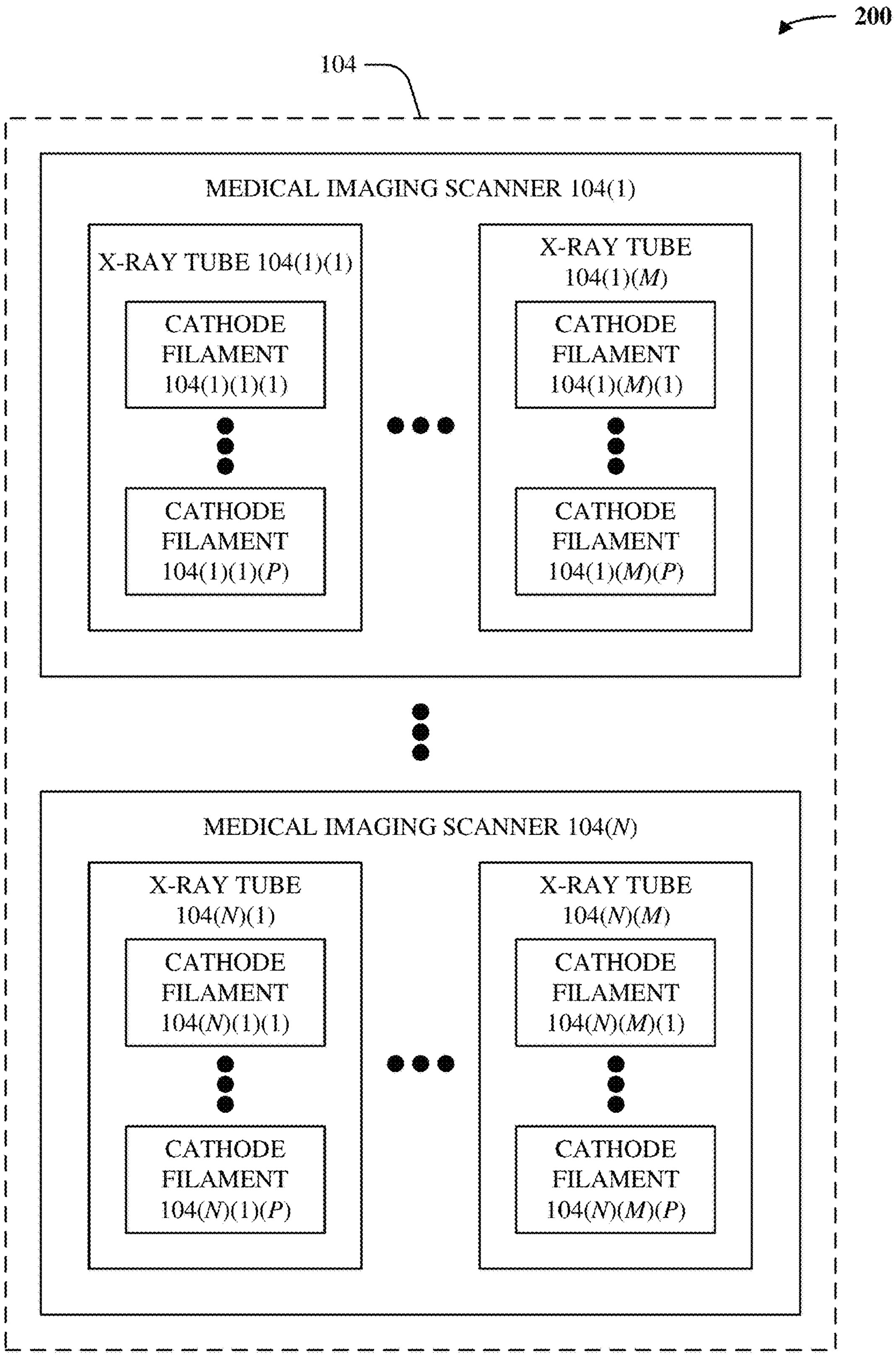
FIG. 2 illustrates an example, non-limiting block diagram of a plurality of medical imaging scanners in accordance with one or more embodiments described herein.

FIG. 2 illustrates an example, non-limiting block diagram 200 of the plurality of medical imaging scanners 104 in accordance with one or more embodiments described herein.

In various aspects, as shown, the plurality of medical imaging scanners 104 can comprise n scanners, for any suitable positive integer n: a medical imaging scanner 104(1) to a medical imaging scanner 104(*n*). In various instances, each of the plurality of medical imaging scanners 104 can be any suitable medical image-capture modality or equipment that utilizes X-ray tube radiation to generate medical images. As a non-limiting example, each of the plurality of medical imaging scanners 104 can be an X-ray scanner that is configured to capture or generate X-ray scanned images of any suitable anatomical structures (e.g., organs, tissues, bodily cavities, bodily fluids) of any suitable medical patients (e.g., humans, animals, or otherwise). As another non-limiting example, each of the plurality of medical imaging scanners 104 can be a CT scanner that is configured to capture or generate CT scanned images of any suitable anatomical structures of any suitable medical patients. As even another non-limiting example, each of the plurality of medical imaging scanners 104 can be a PET scanner that is configured to capture or generate PET scanned images of any suitable anatomical structures of any suitable medical patients. As yet another non-limiting example, each of the plurality of medical imaging scanners 104 can be a nuclear medicine (NM) scanner that is configured to capture or generate NM scanned images of any suitable anatomical structures of any suitable medical patients.

In any case, each of the plurality of medical imaging scanners 104 can comprise any suitable number of X-ray tubes. For instance, the medical imaging scanner 104(1) can comprise m X-ray tubes, for any suitable positive integer m: an X-ray tube 104(1)(1) to an X-ray tube 104(1)(*m*). As another instance, the medical imaging scanner 104(*n*) can comprise m X-ray tubes: an X-ray tube 104(*n*)(1) to an X-ray tube 104(*n*)(*m*). In various aspects, any of such X-ray tubes can exhibit any suitable type, construction, or architecture. As some non-limiting examples, any of such X-ray tubes can be: fixed anode X-ray tubes; rotating anode X-ray tubes; anode-grounded X-ray tubes; cathode-grounded X-ray tubes; bipolar X-ray tubes; X-ray diffraction (XRD) X-ray tubes; X-ray fluorescence (XRF) X-ray tubes; Beryllium window X-ray tubes; ceramic X-ray tubes; metal ceramic X-ray tubes; non-destructive testing (NDT) X-ray tubes; microfocus X-ray tubes; transmission X-ray tubes; or reflection X-ray tubes.

Although FIG. 2 shows each of the plurality of medical imaging scanners 104 as comprising m X-ray tubes, this is a mere non-limiting example for ease of explanation and illustration. In various embodiments, it is to be appreciated that different ones of the plurality of medical imaging scanners 104 can comprise the same or different numbers of X-ray tubes as each other. Likewise, in various embodiments, it is to be appreciated that different ones of the plurality of medical imaging scanners 104 can comprise the same or different types of X-ray tubes as each other.

In various aspects, each X-ray tube of each of the plurality of medical imaging scanners 104 can comprise any suitable number of any suitable types of cathode filaments. As a non-limiting example, the X-ray tube 104(1)(1) can comprise p filaments, for any suitable positive integer p: a cathode filament 104(1)(1)(1) to a cathode filament 104(1)(1)(*p*). As another non-limiting example, the X-ray tube 104(1)(*m*) can comprise p filaments: a cathode filament 104(1)(*m*)(1) to a cathode filament 104(1)(*m*)(*p*). As even another non-limiting example, the X-ray tube 104(*n*)(1) can comprise p filaments: a cathode filament 104(*n*)(1)(1) to a cathode filament 104(*n*)(1)(*p*). As still another non-limiting example, the X-ray tube 104(*n*)(*m*) can comprise p filaments: a cathode filament 104(*n*)(*m*)(1) to a cathode filament 104(*n*)(*m*)(*p*). In various instances, any of such cathode filaments can exhibit any suitable type, construction, or physical properties. As some non-limiting examples, any of such cathode filaments can exhibit: any suitable material composition (e.g., tungsten); any suitable coil length; any suitable wire thickness or wire diameter; any suitable electrical resistance; any suitable thermal conductivity; any suitable heat capacity; or any suitable emissivity.

Although FIG. 2 shows each X-ray tube of the plurality of medical imaging scanners 104 as comprising p cathode filaments, this is a mere non-limiting example for ease of explanation and illustration. In various embodiments, it is to be appreciated that different X-ray tubes of the plurality of medical imaging scanners 104 can comprise the same or different numbers of cathode filaments as each other. Likewise, in various embodiments, it is to be appreciated that different X-ray tubes of the plurality of medical imaging scanners 104 can comprise the same or different types of cathode filaments as each other (e.g., can have the same or different physical attributes or properties as each other).

In various cases, each of the plurality of medical imaging scanners 104 can be located, positioned, or deployed at any suitable physical site. As a non-limiting example, the medical imaging scanner 104(1) can be located, positioned, or deployed at a first physical site (e.g., in a first hospital room; on a first hospital floor; or in a first hospital building), and the medical imaging scanner 104(*n*) can be located, positioned, or deployed at an n-th physical site (e.g., in an n-th hospital room; on an n-th hospital floor; or in an n-th hospital building). Note that, in various instances, different ones of the plurality of medical imaging scanners 104 can be located, positioned, or deployed in or at the same or different physical sites as each other.

Figure 3:
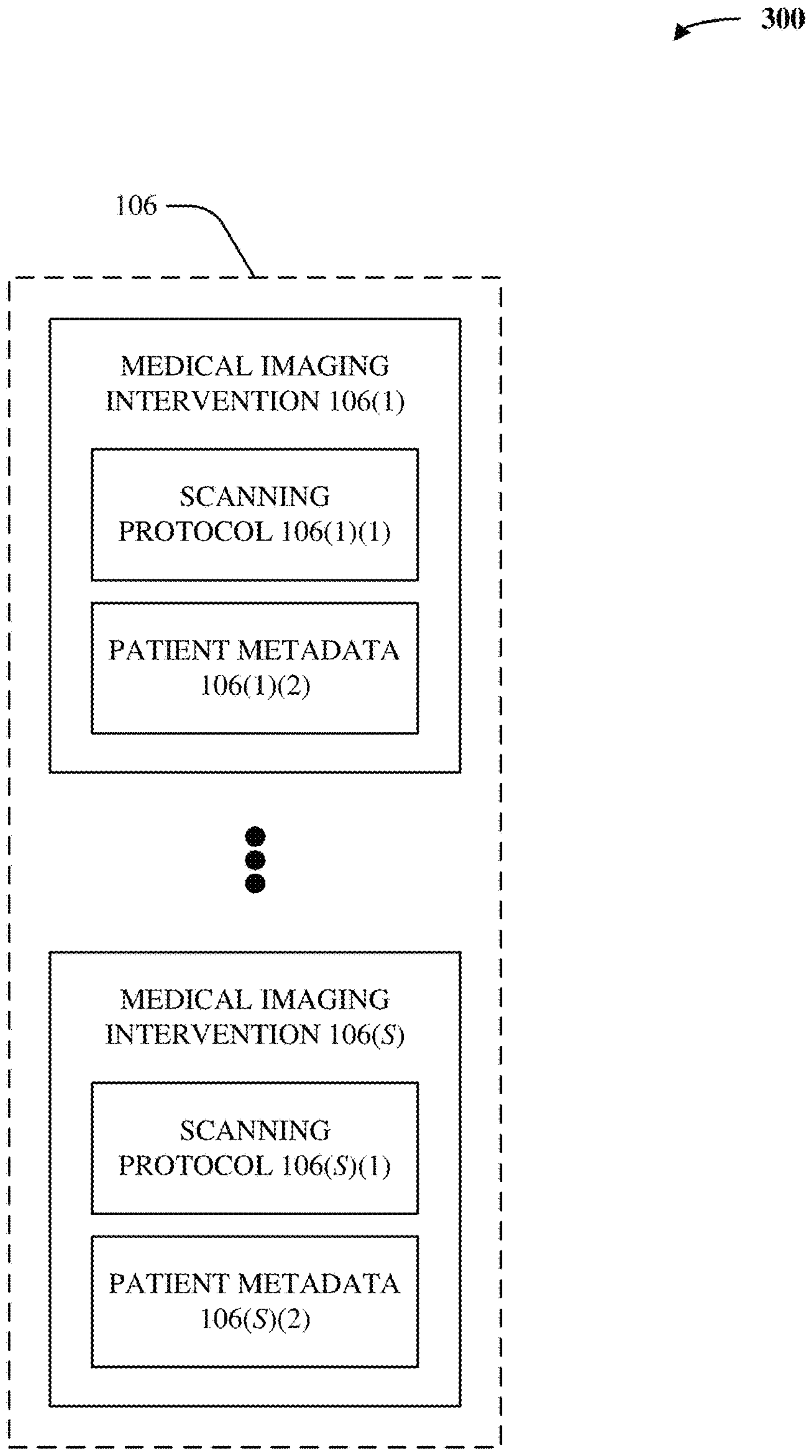
FIG. 3 illustrates an example, non-limiting block diagram of a set of medical imaging interventions in accordance with one or more embodiments described herein.

Now, consider FIG. 3. FIG. 3 illustrates an example, non-limiting block diagram 300 of the set of medical imaging interventions 106 in accordance with one or more embodiments described herein.

In various embodiments, the set of medical imaging interventions 106 can comprise s interventions, for any suitable positive integer s: a medical imaging intervention 106(1) to a medical imaging intervention 106(*s*). In various aspects, each of the set of medical imaging interventions 106 can be considered as a respective scanning protocol that is or has been requested or ordered for a respective medical patient.

As a non-limiting example, the medical imaging intervention 106(1) can comprise a scanning protocol 106(1)(1) and patient metadata 106(1)(2). In various instances, the scanning protocol 106(1)(1) can be any suitable electronic information (e.g., can be one or more scalars, one or more vectors, one or more matrices, one or more tensors, one or more character strings, or any suitable combination thereof) that specifies, indicates, conveys, represents, or otherwise defines a scanning or imaging routine or procedure that is implementable by any of the plurality of medical imaging scanners 104. As some non-limiting examples, the scanning protocol 106(1)(1) can specify: a gantry speed or a gantry range to be implemented by a medical imaging scanner; a table height to be implemented by a medical imaging scanner; a patient position or orientation on the table of a medical imaging scanner; or a tube current or tube voltage to be implemented by a medical imaging scanner. In various cases, the patient metadata 106(1)(2) can be any suitable electronic information (e.g., can be one or more scalars, one or more vectors, one or more matrices, one or more tensors, one or more character strings, or any suitable combination thereof) that specifies, indicates, conveys, or otherwise represents physical characteristics of whatever medical patient on whom it is desired for the scanning protocol 106(1)(1) to be performed. As some non-limiting examples, the patient metadata 106(1)(2) can indicate: an age of the medical patient; a height of the medical patient; a sex of the medical patient; a mass, weight, or body mass index of the medical patient; a pathology of the medical patient; a medication of the medical patient; or a prosthesis or implant of the medical patient. In other words, the patient metadata 106(1)(2) can be considered as medical information pertaining to some particular medical patient for whom a particular medical image is desired, and the scanning protocol 106(1)(1) can be considered as scanner-implementable instructions according to which that particular medical image is supposed to be generated.

As another non-limiting example, the medical imaging intervention 106(*s*) can comprise a scanning protocol 106(*s*)(1) and patient metadata 106(*s*)(2). In various instances, the scanning protocol 106(*s*)(1) can be any suitable electronic information (e.g., can be one or more scalars, one or more vectors, one or more matrices, one or more tensors, one or more character strings, or any suitable combination thereof) that specifies, indicates, conveys, represents, or otherwise defines a scanning or imaging routine or procedure that is implementable by any of the plurality of medical imaging scanners 104. In various cases, the patient metadata 106(*s*)(2) can be any suitable electronic information (e.g., can be one or more scalars, one or more vectors, one or more matrices, one or more tensors, one or more character strings, or any suitable combination thereof) that specifies, indicates, conveys, or otherwise represents physical characteristics of whatever medical patient on whom it is desired for the scanning protocol 106(*s*)(1) to be performed. In other words, the patient metadata 106(*s*)(2) can be considered as medical information pertaining to some specific medical patient for whom a specific medical image is desired, and the scanning protocol 106(*s*)(1) can be considered as scanner-implementable instructions according to which that specific medical image is supposed to be generated.

Returning back to FIG. 1, it can be desired to determine how the set of medical imaging interventions 106 should be allocated among the plurality of medical imaging scanners 104. In other words, it can be desired to determine which specific ones of the set of medical imaging interventions 106 should be performed or implemented by which specific ones of the plurality of medical imaging scanners 104. As described herein, the scanner wear system 102 can facilitate such determination.

In various embodiments, the scanner wear system 102 can comprise a processor 108 (e.g., computer processing unit, microprocessor) and a non-transitory computer-readable memory 110 that is operably or operatively or communicatively connected or coupled to the processor 108. The non-transitory computer-readable memory 110 can store computer-executable instructions which, upon execution by the processor 108, can cause the processor 108 or other components of the scanner wear system 102 (e.g., access component 112, allocation component 114, result component 116) to perform one or more acts. In various embodiments, the non-transitory computer-readable memory 110 can store computer-executable components (e.g., access component 112, allocation component 114, result component 116), and the processor 108 can execute the computer-executable components.

In various embodiments, the scanner wear system 102 can comprise an access component 112. In various aspects, the access component 112 can electronically access the plurality of medical imaging scanners 104 or the set of medical imaging interventions 106. For instance, the access component 112 can electronically communicate with the plurality of medical imaging scanners 104, such that the access component 112 can electronically transmit data to or electronically receive data from any of the plurality of medical imaging scanners 104. As another instance, the access component 112 can electronically retrieve, electronically receive, or otherwise electronically obtain the set of medical imaging interventions 106 from any suitable centralized or decentralized data structures or from any suitable centralized or decentralized computing devices (e.g., from whatever computing devices were used to electronically create or electronically call for the set of medical imaging interventions 106). In any case, the access component 112 can electronically access the plurality of medical imaging scanners 104 or the set of medical imaging interventions 106, such that other components of the scanner wear system 102 can electronically interact (e.g., by proxy) with the plurality of medical imaging scanners 104 or with the set of medical imaging interventions 106.

In various embodiments, the scanner wear system 102 can comprise an allocation component 114. In various aspects, the allocation component 114 can, as described herein, determine a recommended way to allocate the set of medical imaging interventions 106 among the plurality of medical imaging scanners 104, by leveraging a plurality of digital scanner twins.

In various embodiments, the scanner wear system 102 can comprise a result component 116. In various instances, the result component 116 can, as described herein, render or transmit any suitable electronic notification that indicates the allocation determination generated by the allocation component 114.

Figure 4:
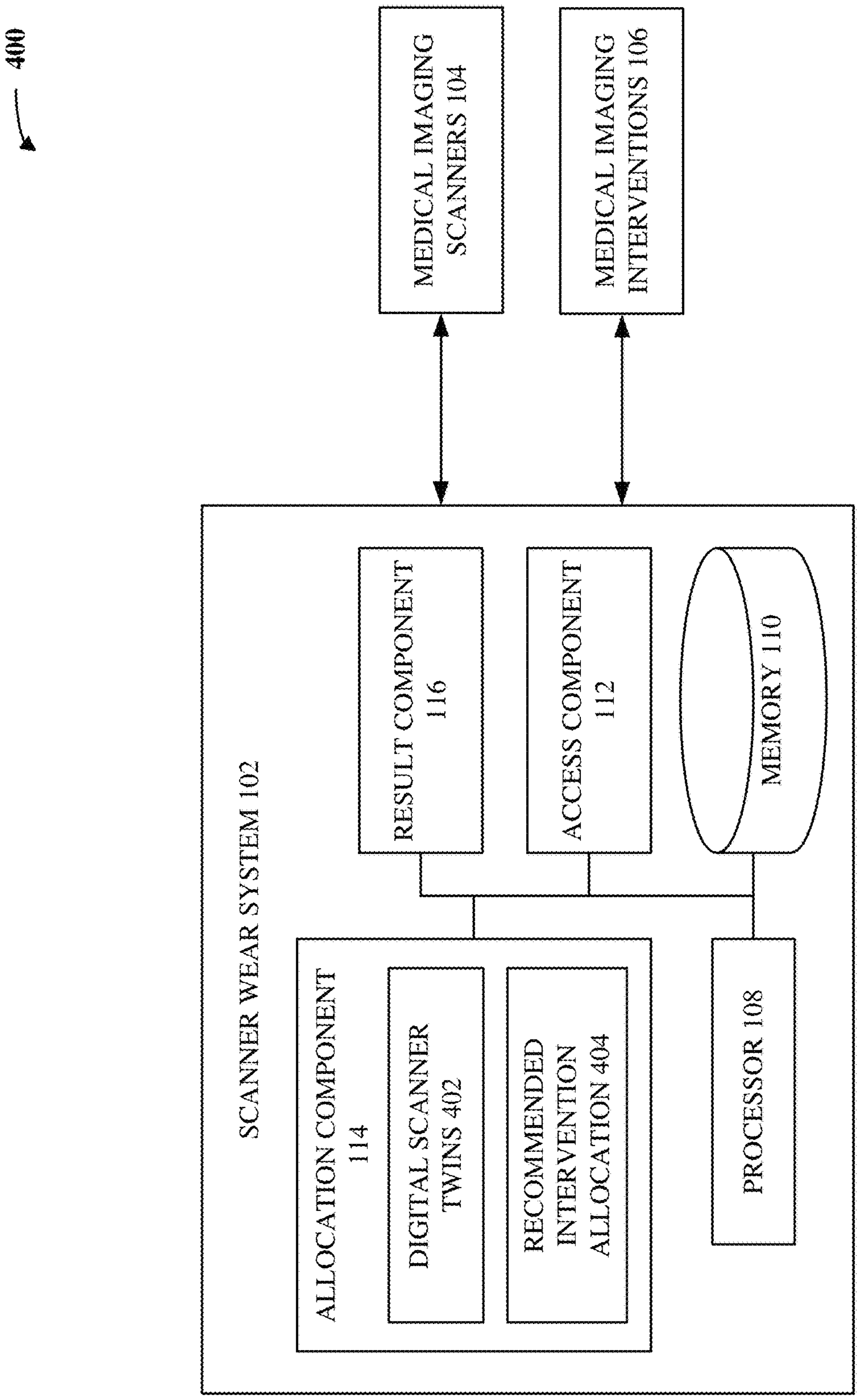
FIG. 4 illustrates a block diagram of an example, non-limiting system including a plurality of digital scanner twins and a recommended intervention allocation that facilitates intelligent intervention allocation for medical imaging scanners in accordance with one or more embodiments described herein.

FIG. 4 illustrates a block diagram of an example, non-limiting system 400 including a plurality of digital scanner twins and a recommended intervention allocation that can facilitate intelligent intervention allocation for medical imaging scanners in accordance with one or more embodiments described herein. As shown, the system 400 can, in some cases, comprise the same components as the system 100, and can further comprise a plurality of digital scanner twins 402 and a recommended intervention allocation 404.

In various embodiments, the allocation component 114 can electronically store, electronically maintain, electronically control, or otherwise electronically access the plurality of digital scanner twins 402. In various aspects, the allocation component 114 can electronically leverage or utilize the plurality of digital scanner twins 402, so as to determine the recommended intervention allocation 404. In various instances, the recommended intervention allocation 404 can be any suitable electronic data (e.g., can be one or more scalars, one or more vectors, one or more matrices, one or more tensors, one or more character strings, or any suitable combination thereof) that specifies, indicates, conveys, or otherwise represents a specific way to allocate or distribute the set of medical imaging interventions 106 among the plurality of medical imaging scanners 104. In particular, the recommended intervention allocation 404 can be considered as an assignment of specific ones of the set of medical imaging interventions 106 to specific ones of the plurality of medical imaging scanners 104, where such specific assignment helps to reduce cathode filament waste associated with the plurality of medical imaging scanners 104 or otherwise helps to increase servicing convenience associated with the plurality of medical imaging scanners 104. Non-limiting aspects, are described with respect to FIGS. 5-9.

Figure 5:
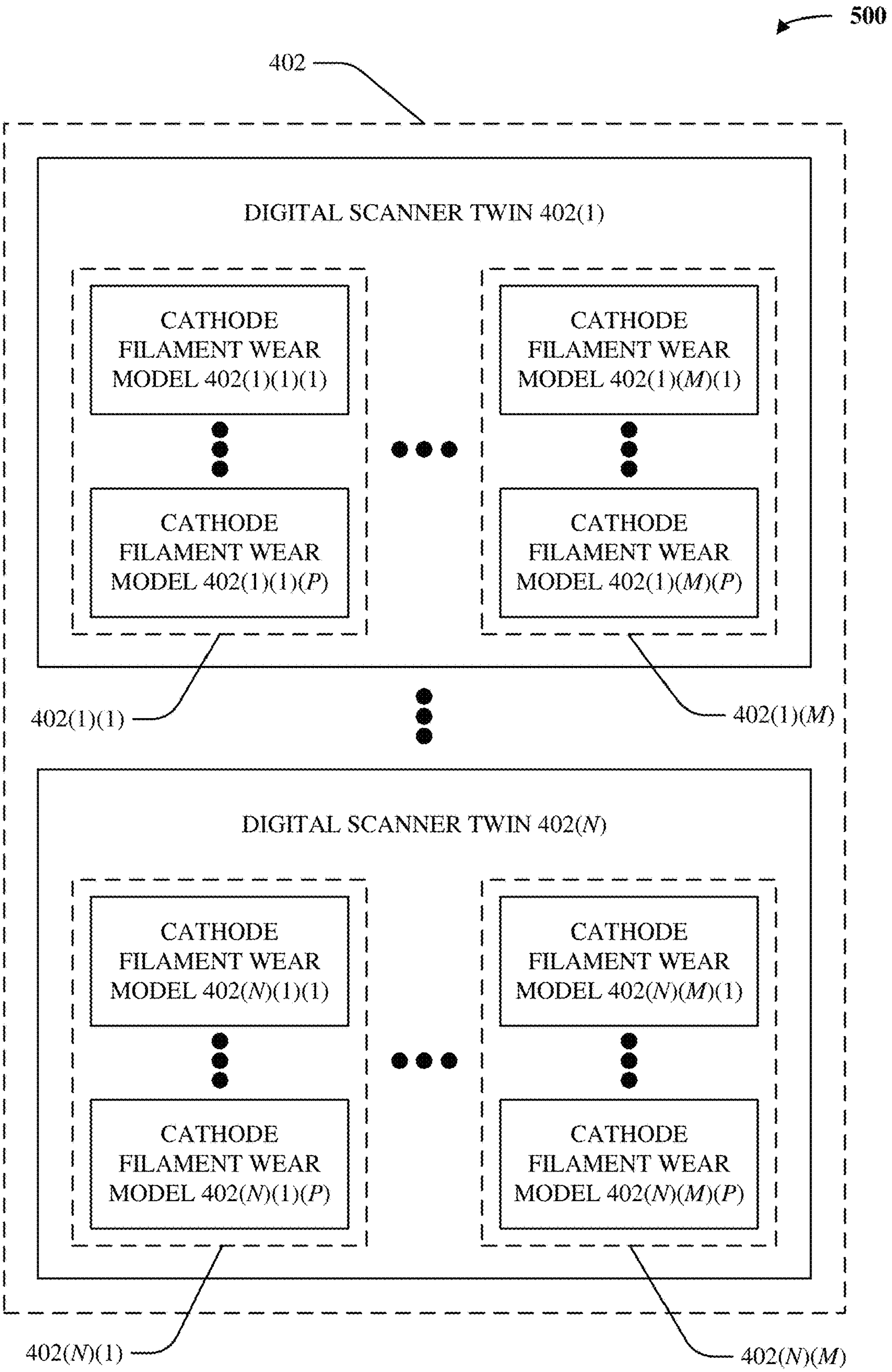
FIG. 5 illustrates an example, non-limiting block diagram of a plurality of digital scanner twins in accordance with one or more embodiments described herein.

FIG. 5 illustrates an example, non-limiting block diagram 500 of the plurality of digital scanner twins 402 in accordance with one or more embodiments described herein.

In various embodiments, the plurality of digital scanner twins 402 can respectively correspond (e.g., in one-to-one fashion) to the plurality of medical imaging scanners 104. Accordingly, since the plurality of medical imaging scanners 104 can comprise n scanners, the plurality of digital scanner twins 402 can comprise n twins: a digital scanner twin 402(1) to a digital scanner twin 402(*n*). In various aspects, each of the plurality of digital scanner twins 402 can be considered as a virtualization that electronically models or forecasts the wear accumulated by the cathode filaments of a respective one of the plurality of medical imaging scanners 104.

As a non-limiting example, the digital scanner twin 402(1) can correspond to the medical imaging scanner 104(1). Thus, the digital scanner twin 402(1) can be considered as a virtualized version of the medical imaging scanner 104(1), which virtualized version can model or forecast how the cathode filaments of the medical imaging scanner 104(1) accumulate wear over time. In particular, the digital scanner twin 402(1) can comprise a set of cathode filament wear models 402(1)(1). In various cases, the set of cathode filament wear models 402(1)(1) can respectively correspond to the cathode filaments of the X-ray tube 104(1)(1). So, since the X-ray tube 104(1)(1) has p cathode filaments, the set of cathode filament wear models 402(1)(1) can likewise comprise p models: a cathode filament wear model 402(1)(1)(1) to a cathode filament wear model 402(1)(1)(*p*). In various aspects, each of the set of cathode filament wear models 402(1)(1) can be any suitable computational, numerical, or mathematical model that can simulate, quantify, or otherwise estimate the wear or degradation accumulated by a respective cathode filament of the X-ray tube 104(1)(1).

For instance, the cathode filament wear model 402(1)(1)(1) can correspond to the cathode filament 104(1)(1)(1). Accordingly, the cathode filament wear model 402(1)(1)(1) can computationally, numerically, or mathematically simulate how wear, degradation, corrosion, or damage builds up in the cathode filament 104(1)(1)(1). In some cases, the cathode filament wear model 402(1)(1)(1) can comprise or otherwise be based on any suitable number of any suitable types of physics equations that relate to the cathode filament 104(1)(1)(1). Non-limiting examples of such physics equations can include: energy balance differential or non-differential equations; mass continuity differential or non-differential equations; heat transfer differential or non-differential equations; electric charge conservation differential or non-differential equations; or corrosion damage differential or non-differential equations.

In various aspects, the cathode filament wear model 402(1)(1)(1) can comprise or utilize as constants any suitable physical properties, attributes, or characteristics of the cathode filament 104(1)(1)(1). Non-limiting examples of such physical properties, attributes, or characteristics can include: a material composition of the cathode filament 104(1)(1)(1); a coil length of the cathode filament 104(1)(1)(1); a thickness, diameter, or radius of the cathode filament 104(1)(1)(1); an electrical resistance of the cathode filament 104(1)(1)(1); a thermal conductivity of the cathode filament 104(1)(1)(1); a heat capacity of the cathode filament 104(1)(1)(1); or an emissivity of the cathode filament 104(1)(1)(1).

In various instances, the cathode filament wear model 402(1)(1)(1) can comprise or utilize as arguments any suitable operational input parameters that describe or define how the cathode filament 104(1)(1)(1) has been used, is being used, or might be used. Non-limiting examples of such operational input parameters can include: an electric current that has been applied, that is being applied, or that might be applied to the cathode filament 104(1)(1)(1); a time span during which an electric current has been applied, is being applied, or might be applied to the cathode filament 104(1)(1)(1); an electric voltage that has been applied, that is being applied, or that might be applied to the cathode filament 104(1)(1)(1); a time span during which an electric voltage has been applied, is being applied, or might be applied to the cathode filament 104(1)(1)(1); an ambient temperature that has been applied, that is being applied, or that might be applied to the cathode filament 104(1)(1)(1); or a time span during which an ambient temperature has been applied, is being applied, or might be applied to the cathode filament 104(1)(1)(1). In various cases, the cathode filament wear model 402(1)(1)(1) can treat such operational input parameters as independent variables, and the cathode filament wear model 402(1)(1)(1) can compute or calculate as a dependent variable a total amount or quantity of wear that is, has been, or will be accumulated by the cathode filament 104(1)(1)(1) since the cathode filament 104(1)(1)(1) was new (e.g., since the X-ray tube 104(1)(1) was freshly installed in the medical imaging scanner 104(1)).

Note that the electric currents, electric voltages, ambient temperatures, or times exposed to such currents, voltages, or temperatures can vary with whatever medical imaging interventions that the cathode filament 104(1)(1)(1) is used to implement. Indeed, different scanning protocols applied to different medical patients can necessitate or require that the cathode filament 104(1)(1)(1) be subjected to different currents, voltages, or temperatures for different spans of time (e.g., a head scan protocol can use different currents or voltages than a foot scan protocol; a physically larger or heavier patient can require higher currents or voltages than a physically smaller or lighter patient; a pregnant patient can require lower currents or voltages than a non-pregnant patient; a patient with a pacemaker can require lower currents or voltages than a patient without a pacemaker).

Accordingly, in various aspects, the cathode filament wear model 402(1)(1)(1) can be considered as indicating how much wear the cathode filament 104(1)(1)(1) actually has at a current or present time (e.g., due to actual prior use of the medical imaging scanner 104(1)), and the cathode filament wear model 402(1)(1)(1) can be considered as being able to simulate, estimate, or forecast how much wear the cathode filament 104(1)(1)(1) would accumulate or will have accumulated if any given medical imaging intervention were to be carried out by the medical imaging scanner 104(1).

Similarly, the cathode filament wear model 402(1)(1)(*p*) can correspond to the cathode filament 104(1)(1)(*p*). Accordingly, the cathode filament wear model 402(1)(1)(*p*) can computationally, numerically, or mathematically simulate, estimate, or forecast (e.g., based on any suitable differentiable or non-differential equations that take as constants any suitable physical attributes of the cathode filament 104(1)(1)(*p*) or that take as arguments any suitable currents, voltages, temperatures, or usage times experienced by the cathode filament 104(1)(1)(*p*)) how wear would build up or accumulate in the cathode filament 104(1)(1)(*p*). Thus, in various aspects, the cathode filament wear model 402(1)(1)(*p*) can be considered as indicating how much wear the cathode filament 104(1)(1)(*p*) actually has at a current or present time, and the cathode filament wear model 402(1)(1)(*p*) can be considered as being able to simulate, estimate, or forecast how much wear the cathode filament 104(1)(1)(*p*) would accumulate or will have accumulated if any given medical imaging intervention were to be carried out by the medical imaging scanner 104(1).

In various embodiments, the digital scanner twin 402(1) can further comprise a set of cathode filament wear models 402(1)(*m*). In various cases, the set of cathode filament wear models 402(1)(*m*) can respectively correspond to the cathode filaments of the X-ray tube 104(1)(*m*). So, since the X-ray tube 104(1)(*m*) has p cathode filaments, the set of cathode filament wear models 402(1)(*m*) can likewise comprise p models: a cathode filament wear model 402(1)(*m*)(1) to a cathode filament wear model 402(1)(*m*)(*p*). In various aspects, each of the set of cathode filament wear models 402(1)(*m*) can be any suitable computational, numerical, or mathematical model that can simulate, quantify, or otherwise estimate the wear accumulated by a respective cathode filament of the X-ray tube 104(1)(*m*).

For instance, the cathode filament wear model 402(1)(*m*)(1) can correspond to the cathode filament 104(1)(*m*)(1). Accordingly, the cathode filament wear model 402(1)(*m*)(1) can be considered as indicating how much wear the cathode filament 104(1)(*m*)(1) actually has at a current or present time, and the cathode filament wear model 402(1)(*m*)(1) can be considered as being able to simulate, estimate, or forecast how much wear the cathode filament 104(1)(*m*)(1) would accumulate or will have accumulated if any given medical imaging intervention were to be carried out by the medical imaging scanner 104(1).

Likewise, the cathode filament wear model 402(1)(*m*)(*p*) can correspond to the cathode filament 104(1)(*m*)(*p*). Thus, the cathode filament wear model 402(1)(*m*)(*p*) can be considered as indicating how much wear the cathode filament 104(1)(*m*)(*p*) actually has at a current or present time, and the cathode filament wear model 402(1)(*m*)(*p*) can be considered as being able to simulate, estimate, or forecast how much wear the cathode filament 104(1)(*m*)(*p*) would accumulate or will have accumulated if any given medical imaging intervention were to be carried out by the medical imaging scanner 104(1).

As another non-limiting example, the digital scanner twin 402(*n*) can correspond to the medical imaging scanner 104(*n*). Thus, the digital scanner twin 402(*n*) can be considered as a virtualized version of the medical imaging scanner 104(*n*), which virtualized version can model or forecast how the cathode filaments of the medical imaging scanner 104(*n*) accumulate wear, degradation, damage, or corrosion over time. In particular, the digital scanner twin 402(*n*) can comprise a set of cathode filament wear models 402(*n*)(1). In various cases, the set of cathode filament wear models 402(*n*)(1) can respectively correspond to the cathode filaments of the X-ray tube 104(*n*)(1). So, since the X-ray tube 104(*n*)(1) has p cathode filaments, the set of cathode filament wear models 402(*n*)(1) can likewise comprise p models: a cathode filament wear model 402(*n*)(1)(1) to a cathode filament wear model 402(*n*)(1)(*p*). In various aspects, each of the set of cathode filament wear models 402(*n*)(1) can be any suitable computational, numerical, or mathematical model that can simulate, quantify, or otherwise estimate the wear accumulated by a respective cathode filament of the X-ray tube 104(*n*)(1).

For instance, the cathode filament wear model 402(*n*)(1)(1) can correspond to the cathode filament 104(*n*)(1)(1). Accordingly, the cathode filament wear model 402(*n*)(1)(1) can be considered as indicating how much wear the cathode filament 104(*n*)(1)(1) actually has at a current or present time, and the cathode filament wear model 402(*n*)(1)(1) can be considered as being able to simulate, estimate, or forecast how much wear the cathode filament 104(*n*)(1)(1) would accumulate or will have accumulated if any given medical imaging intervention were to be carried out by the medical imaging scanner 104(*n*).

Similarly, the cathode filament wear model 402(*n*)(1)(*p*) can correspond to the cathode filament 104(*n*)(1)(*p*). Thus, the cathode filament wear model 402(*n*)(1)(*p*) can be considered as indicating how much wear the cathode filament 104(*n*)(1)(*p*) actually has at a current or present time, and the cathode filament wear model 402(*n*)(1)(*p*) can be considered as being able to simulate, estimate, or forecast how much wear the cathode filament 104(*n*)(1)(*p*) would accumulate or will have accumulated if any given medical imaging intervention were to be carried out by the medical imaging scanner 104(*n*).

In various embodiments, the digital scanner twin 402(*n*) can further comprise a set of cathode filament wear models 402(*n*)(*m*). In various cases, the set of cathode filament wear models 402(*n*)(*m*) can respectively correspond to the cathode filaments of the X-ray tube 104(*n*)(*m*). So, since the X-ray tube 104(*n*)(*m*) has p cathode filaments, the set of cathode filament wear models 402(*n*)(*m*) can likewise comprise p models: a cathode filament wear model 402(*n*)(*m*)(1) to a cathode filament wear model 402(*n*)(*m*)(*p*). In various aspects, each of the set of cathode filament wear models 402(*n*)(*m*) can be any suitable computational, numerical, or mathematical model that can simulate, quantify, or otherwise estimate the wear accumulated by a respective cathode filament of the X-ray tube 104(*n*)(*m*).

For instance, the cathode filament wear model 402(*n*)(*m*)(1) can correspond to the cathode filament 104(*n*)(*m*)(1). Accordingly, the cathode filament wear model 402(*n*)(*m*)(1) can be considered as indicating how much wear the cathode filament 104(*n*)(*m*)(1) actually has at a current or present time, and the cathode filament wear model 402(*n*)(*m*)(1) can be considered as being able to simulate, estimate, or forecast how much wear the cathode filament 104(*n*)(*m*)(1) would accumulate or will have accumulated if any given medical imaging intervention were to be carried out by the medical imaging scanner 104(*n*).

Likewise, the cathode filament wear model 402(*n*)(*m*)(*p*) can correspond to the cathode filament 104(*n*)(*m*)(*p*). So, the cathode filament wear model 402(*n*)(*m*)(*p*) can be considered as indicating how much wear the cathode filament 104(*n*)(*m*)(*p*) actually has at a current or present time, and the cathode filament wear model 402(*n*)(*m*)(*p*) can be considered as being able to simulate, estimate, or forecast how much wear the cathode filament 104(*n*)(*m*)(*p*) would accumulate or will have accumulated if any given medical imaging intervention were to be carried out by the medical imaging scanner 104(*n*).

In any case, the plurality of digital scanner twins 402 can be considered as respectively modeling or simulating the accumulated cathode filament wears of the plurality of medical imaging scanners 104, and the allocation component 114 can leverage the plurality of digital scanner twins 402 to determine the recommended intervention allocation 404. In some embodiments, the allocation component 114 can facilitate such determination via an optimizer engine, as described with respect to FIGS. 6-7. In other embodiments, the allocation component 114 can instead facilitate such determination via a deep learning neural network, as described with respect to FIGS. 8-9.

Figure 6:
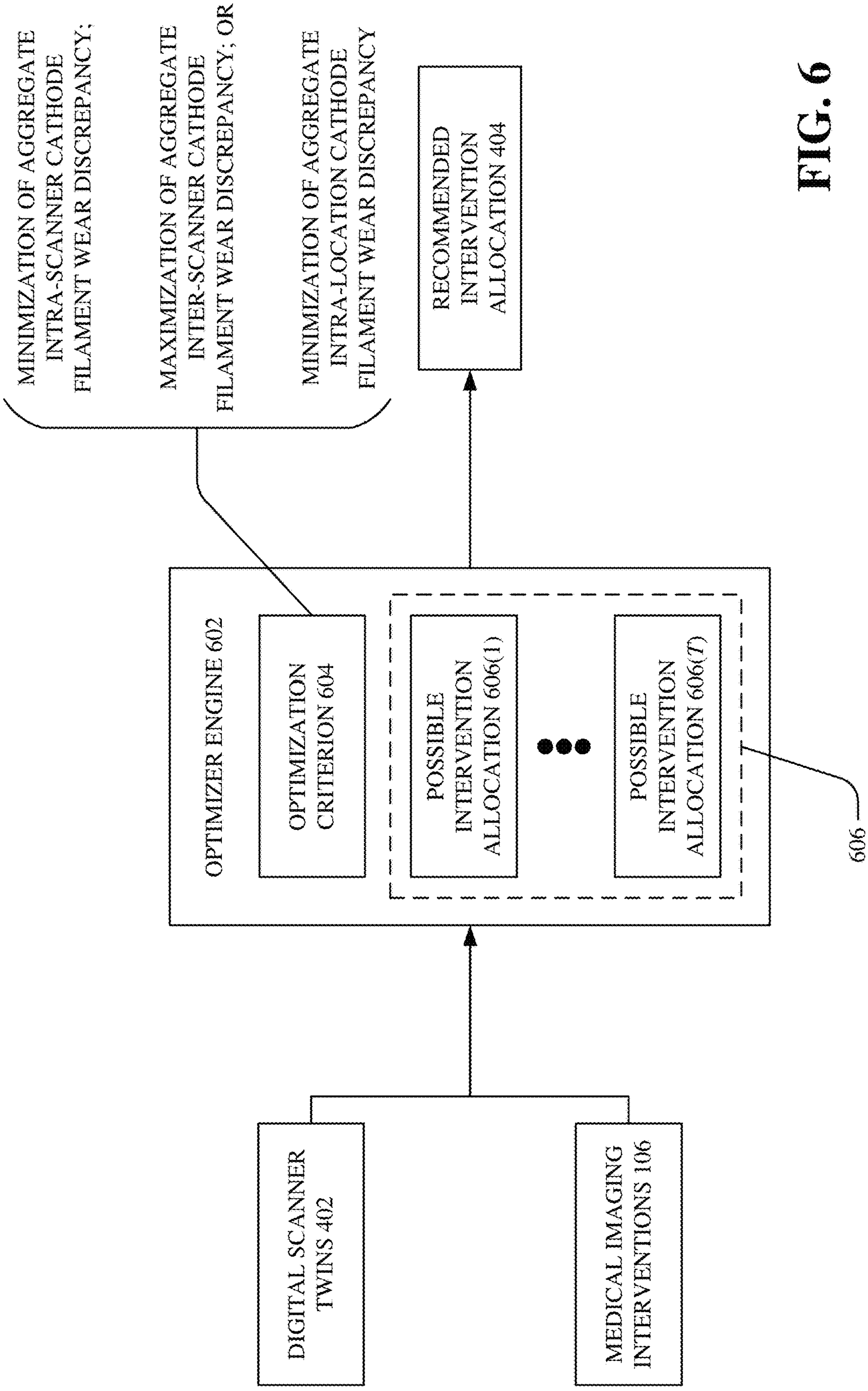
FIGS. 6-7 illustrate example, non-limiting block diagrams showing how an optimizer engine can be leveraged to generate a recommended intervention allocation in accordance with one or more embodiments described herein.
Figure 7:
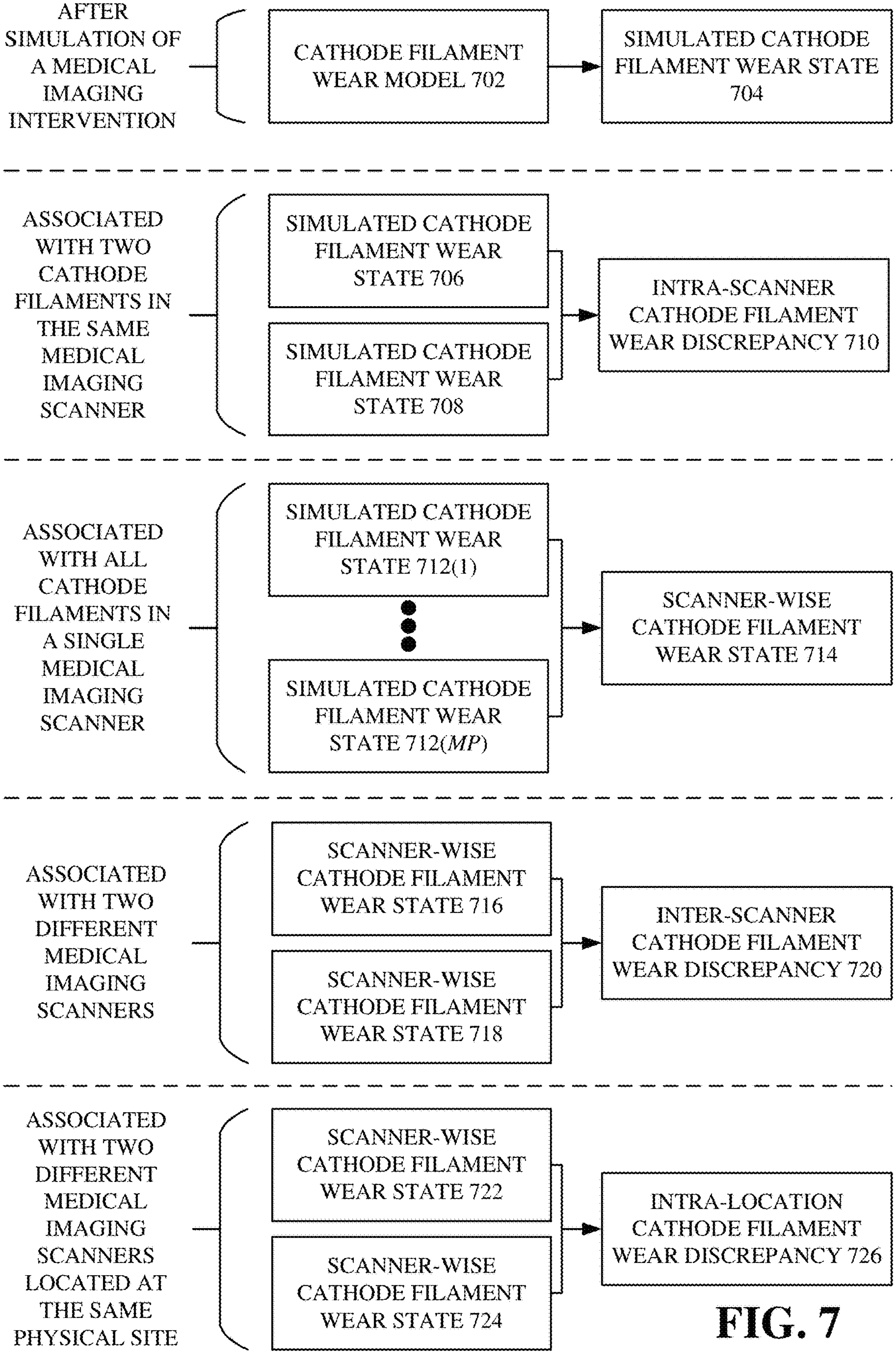

FIGS. 6-7 illustrate example, non-limiting block diagrams showing how an optimizer engine can be leveraged to generate a recommended intervention allocation in accordance with one or more embodiments described herein.

First, consider FIG. 6. In various embodiments, the allocation component 114 can electronically store, electronically maintain, electronically control, or otherwise electronically access an optimizer engine 602. In various aspects, the optimizer engine 602 can be any suitable optimization platform or optimization software. As a non-limiting, the optimizer engine 602 can be a CPLEX® optimizer. As another non-limiting example, the optimizer engine 602 can be a Gurobi® optimizer. In any case, the optimizer engine 602 can electronically adjust or manipulate operational input parameters (e.g., applied electric current values; applied electric voltage values; applied ambient temperature values; applied usage time values) of the plurality of digital scanner twins 402, so as to simulate how various different intervention allocations would affect the accumulated cathode filament wear profiles of the plurality of medical imaging scanners 104.

More specifically, the optimizer engine 602 can electronically identify a set of possible intervention allocations 606. In various aspects, the set of possible intervention allocations 606 can comprise t allocations, for any suitable positive integer t: a possible intervention allocation 606(1) to a possible intervention allocation 606(*t*). In various instances, each of the set of possible intervention allocations 606 can be a unique or distinct way of allocating or distributing the set of medical imaging interventions 106 among the plurality of medical imaging scanners 104 (e.g., can be a unique or distinct determination of which specific ones of the plurality of medical imaging scanners 104 should perform or execute which specific ones of the set of medical imaging interventions 106). Note that, in some cases, a possible intervention allocation can assign more than one medical imaging intervention to any given medical imaging scanner. Conversely, note that, in some cases, a possible intervention allocation can assign zero medical imaging interventions to any given medical imaging scanner. In various aspects, the set of possible intervention allocations 606 can span or otherwise include all possible permutations or combinations of intervention-to-scanner assignments. In other aspects, however, the set of possible intervention allocations 606 can include fewer than all possible permutations or combinations of intervention-to-scanner assignments.

In any case, the optimizer engine 602 can simulate each of the set of possible intervention allocations 606 on the plurality of digital scanner twins 402, so as to determine how each of the set of possible intervention allocations 606 would affect the accumulated cathode filament wears of the plurality of medical imaging scanners 104. In various aspects, the optimizer engine 602 can then select, as the recommended intervention allocation 404, whichever of the set of possible intervention allocations 606 best satisfies an optimization criterion 604. In some cases, the optimization criterion 604 can be minimization of an aggregate intra-scanner cathode filament wear discrepancy that is exhibited post-simulation by the plurality of digital scanner twins 402. In other cases, the optimization criterion 604 can be maximization of an aggregate inter-scanner cathode filament wear discrepancy that is exhibited post-simulation by the plurality of digital scanner twins 402. In yet other cases, the optimization criterion 604 can be minimization of an aggregate intra-location cathode filament wear discrepancy that is exhibited post-simulation by the plurality of digital scanner twins 402. For non-limiting clarification, consider FIG. 7.

FIG. 7 illustrates various different quantities that can be exhibited by, outputted by, or derived from the plurality of digital scanner twins 402.

In various aspects, there can be a cathode filament wear model 702. In various instances, the cathode filament wear model 702 can be any cathode filament wear model in the plurality of digital scanner twins 402 (e.g., any of 402(1)(1); any of 402(1)(*m*); any of 402(*n*)(1); any of 402(*n*)(*m*)). Accordingly, the cathode filament wear model 702 can be considered as corresponding to a given cathode filament of a given medical imaging scanner (e.g., any of 104).

In various cases, prior to its operational input parameters being manipulated or adjusted by the optimizer engine 602, the cathode filament wear model 702 can indicate a present-time wear state of the given cathode filament. In various cases, the present-time wear state can be any suitable electronic data (e.g., one or more scalars, one or more vectors, one or more matrices, one or more tensors, or any suitable combination thereof) that indicates how much total wear is or has already been accumulated by the given cathode filament since the given cathode filament was new or freshly installed.

In various aspects, consider a possible intervention allocation (e.g., any of 606) that allocates or assigns a given medical imaging intervention (e.g., any of 106) to the given medical imaging scanner. In various instances, the optimizer engine 602 can manipulate or adjust the operational input parameters of the cathode filament wear model 702, based on, as specified by, or otherwise in accordance with that given medical imaging intervention. Such manipulation or adjustment can cause the cathode filament wear model 702 to compute or calculate a simulated cathode filament wear state 704. In various cases, the simulated cathode filament wear state 704 can be any suitable electronic data (e.g., one or more scalars, one or more vectors, one or more matrices, one or more tensors, or any suitable combination thereof) that indicates how much total wear would be accumulated by the given cathode filament, if the given medical imaging intervention were to be actually implemented or executed by the given medical imaging scanner.

In various aspects, the optimizer engine 602 can compute an intra-scanner cathode filament wear discrepancy, based on any two simulated cathode filament wear states that correspond to a same medical imaging scanner. As a non-limiting example, suppose that a particular medical imaging scanner comprises a first cathode filament and a second cathode filament. In various instances, the optimizer engine 602 can, as described above, compute: a simulated cathode filament wear state 706 for the first cathode filament; and a simulated cathode filament wear state 708 for the second cathode filament. Because the first cathode filament and the second cathode filament can both belong to the particular medical imaging scanner (e.g., to the same scanner as each other), the optimizer engine 602 can compute an intra-scanner cathode filament wear discrepancy 710, based on the simulated cathode filament wear state 706 and based on the simulated cathode filament wear state 708. More specifically, the intra-scanner cathode filament wear discrepancy 710 can be equal to, or otherwise based on, an absolute value of a difference between the simulated cathode filament wear state 706 and the simulated cathode filament wear state 708.

Recall that, in the non-limiting examples shown in the figures, the plurality of medical imaging scanners 104 can comprise n scanners, and each medical imaging scanner can comprise mp cathode filaments. Accordingly, in the non-limiting examples of the figures, the optimizer engine 602 can compute a total of $$n*\binom{\text{mp}}{2}$$

(e.g., where $$\binom{\text{mp}}{2}$$

can be read as "mp choose 2") intra-scanner cathode filament wear discrepancies for any given intervention allocation. In various instances, the optimizer engine 602 can aggregate such $$n*\binom{\text{mp}}{2}$$

intra-scanner cathode filament wear discrepancies together, such as via averaging, summation, multiplication, or any suitable combination thereof. Such aggregation can be considered as yielding an aggregate intra-scanner cathode filament wear discrepancy that would be yielded or achieved if that given intervention allocation were actually implemented. In various cases, as mentioned above, the optimization criterion 604 can be minimization of such an aggregate intra-scanner cathode filament wear discrepancy. In other words, the optimizer engine 602 can simulate each of the set of possible intervention allocations 606 on the plurality of digital scanner twins 402, thereby yielding a respective aggregate intra-scanner cathode filament wear discrepancy for each of the set of possible intervention allocations 606, and the optimizer engine 602 can select as the recommended intervention allocation 404 whichever of the set of possible intervention allocations 606 has a lowest or smallest aggregate intra-scanner cathode filament wear discrepancy. In such cases, the recommended intervention allocation 404 can be considered as best causing the cathode filaments of each individual one of the plurality of medical imaging scanners to be evenly worn, so as to minimize instances where an X-ray tube is likely to reach the end of its useful life while it nevertheless has one or more significantly non-depleted cathode filaments, and so as to minimize instances where one or more X-ray tubes of a medical imaging scanner are at the end of their useful lives while one or more other X-ray tubes of that same medical imaging scanner still have significant useful lives remaining. In other words, the recommended intervention allocation 404, in such cases, can be considered as reducing cathode filament waste and as increasing the convenience of scanner servicing.

Now, in the non-limiting examples of the figures, any given medical imaging scanner can comprise mp cathode filaments. In various aspects, as described above, the optimizer engine 602 can compute or calculate a respective simulated cathode filament wear state for each of those mp cathode filaments. For ease of explanation, these can be referred to as a simulated cathode filament wear state 712(1) to a simulated cathode filament wear state 712(*mp*). In various instances, the optimizer engine 602 can aggregate such mp simulated cathode filament wear states together, such as via averaging, summation, multiplication, or any suitable combination thereof. Such aggregation can be considered as yielding a scanner-wise cathode filament wear state 714 for the given medical imaging scanner.

In various aspects, the optimizer engine 602 can compute an inter-scanner cathode filament wear discrepancy, based on any two scanner-wise cathode filament wear states that respectively correspond to any two medical imaging scanners. As a non-limiting example, consider a first medical imaging scanner (e.g., one of 104) and a second medical imaging scanner (e.g., another of 104). In various instances, the optimizer engine 602 can, as described above, compute: a scanner-wise cathode filament wear state 716 for the first medical imaging scanner; and a scanner-wise cathode filament wear state 718 for the second medical imaging scanner. In various cases, the optimizer engine 602 can compute an intra-scanner cathode filament wear discrepancy 720, based on the scanner-wise cathode filament wear state 716 and based on the scanner-wise cathode filament wear state 718. More specifically, the inter-scanner cathode filament wear discrepancy 720 can be equal to, or otherwise based on, an absolute value of a difference between the scanner-wise cathode filament wear state 716 and the scanner-wise cathode filament wear state 718.

Recall that, in the non-limiting examples shown in the figures, the plurality of medical imaging scanners 104 can comprise n scanners. Accordingly, in the non-limiting examples of the figures, the optimizer engine 602 can compute a total of $$\binom{n}{2}$$

inter-scanner cathode filament wear discrepancies for any given intervention allocation. In various instances, the optimizer engine 602 can aggregate such $$\binom{n}{2}$$

inter-scanner cathode filament wear discrepancies together, such as via averaging, summation, multiplication, or any suitable combination thereof. Such aggregation can be considered as yielding an aggregate inter-scanner cathode filament wear discrepancy that would be achieved if that given intervention allocation were to be actually implemented. In various cases, as mentioned above, the optimization criterion 604 can be maximization of such an aggregate inter-scanner cathode filament wear discrepancy. In other words, the optimizer engine 602 can simulate each of the set of possible intervention allocations 606 on the plurality of digital scanner twins 402, thereby yielding a respective aggregate inter-scanner cathode filament wear discrepancy for each of the set of possible intervention allocations 606, and the optimizer engine 602 can select as the recommended intervention allocation 404 whichever of the set of possible intervention allocations 606 has a highest or greatest aggregate inter-scanner cathode filament wear discrepancy. In such cases, the recommended intervention allocation 404 can be considered as best causing the cathode filaments of the plurality of medical imaging scanners 104 to be worn in stagger-synchronized fashion, so as to minimize instances where many of the plurality of medical imaging scanners 104 are likely to be down or offline for servicing at the same time as each other. In other words, the recommended intervention allocation 404 in such cases can be considered as helping to prevent mass or widespread downtime of the plurality of medical imaging scanners 104.

Now, as mentioned above, any of the plurality of medical imaging scanners 104 can be located at the same or different physical sites as each other. In various aspects, the optimizer engine 602 can compute an intra-location cathode filament wear discrepancy, based on any two scanner-wise cathode filament wear states that respectively correspond to any two medical imaging scanners that are located or deployed at the same physical site as each other. As a non-limiting example, consider a first medical imaging scanner (e.g., one of 104) and a second medical imaging scanner (e.g., another of 104) that are both deployed at a specific physical site. In various instances, the optimizer engine 602 can, as described above, compute: a scanner-wise cathode filament wear state 722 for the first medical imaging scanner; and a scanner-wise cathode filament wear state 724 for the first medical imaging scanner. In various cases, because the first and second medical imaging scanners are both located at the specific physical site, the optimizer engine 602 can compute an intra-location cathode filament wear discrepancy 726, based on the scanner-wise cathode filament wear state 722 and based on the scanner-wise cathode filament wear state 724. More specifically, the intra-scanner cathode filament wear discrepancy 726 can be equal to, or otherwise based on, an absolute value of a difference between the scanner-wise cathode filament wear state 722 and the scanner-wise cathode filament wear state 724.

So, for any given intervention allocation, the optimizer engine 602 can, as described above, compute or calculate a respective intra-location cathode filament wear discrepancy for each distinct or unique pair of medical imaging scanners that are located at the same physical site as each other. In various instances, the optimizer engine 602 can aggregate such various intra-location cathode filament wear discrepancies together, such as via averaging, summation, multiplication, or any suitable combination thereof. Such aggregation can be considered as yielding an aggregate intra-location cathode filament wear discrepancy that would be achieved if the given intervention allocation were to be actually implemented. In various cases, as mentioned above, the optimization criterion 604 can be minimization of such an aggregate intra-location cathode filament wear discrepancy. In other words, the optimizer engine 602 can simulate each of the set of possible intervention allocations 606 on the plurality of digital scanner twins 402, thereby yielding a respective aggregate intra-location cathode filament wear discrepancy for each of the set of possible intervention allocations 606, and the optimizer engine 602 can select as the recommended intervention allocation 404 whichever of the set of possible intervention allocations 606 has a lowest or smallest aggregate intra-location cathode filament wear discrepancy. In such cases, the recommended intervention allocation 404 can be considered as best causing the plurality of medical imaging scanners 104 to be worn in location-synchronized fashion, so as to minimize instances where many of the plurality of medical imaging scanners 104 that are deployed at the same physical site as each other are likely to warrant servicing at the significantly different or staggered times as each other. In other words, the recommended intervention allocation 404 in such cases can be considered as helping to increase scanner servicing convenience.

In various embodiments, the above-described implementations of the optimization criterion 604 are mere non-limiting examples. In various aspects, the optimization criterion 604 can involve minimization or maximization of any other suitable values. In some instances, the optimization criterion 604 can even involve any suitable combination of the aforementioned (e.g., can involve simultaneous optimization of intra-scanner cathode filament wear discrepancies, of inter-scanner cathode filament wear discrepancies, or of intra-location cathode filament wear discrepancies).

Note that, in some cases, the optimizer engine 602 can implement a brute-force or exhaustive optimization algorithm or technique. However, this is a mere non-limiting example. In other cases, the optimizer engine 602 can implement any other suitable type of optimization algorithm or technique, such as: gradient descent; differential evolution; evolutionary algorithms; genetic algorithms; Nelder-Mead simplicial heuristic techniques; stochastic tunneling; or simultaneous perturbation stochastic approximation.

Figure 8:
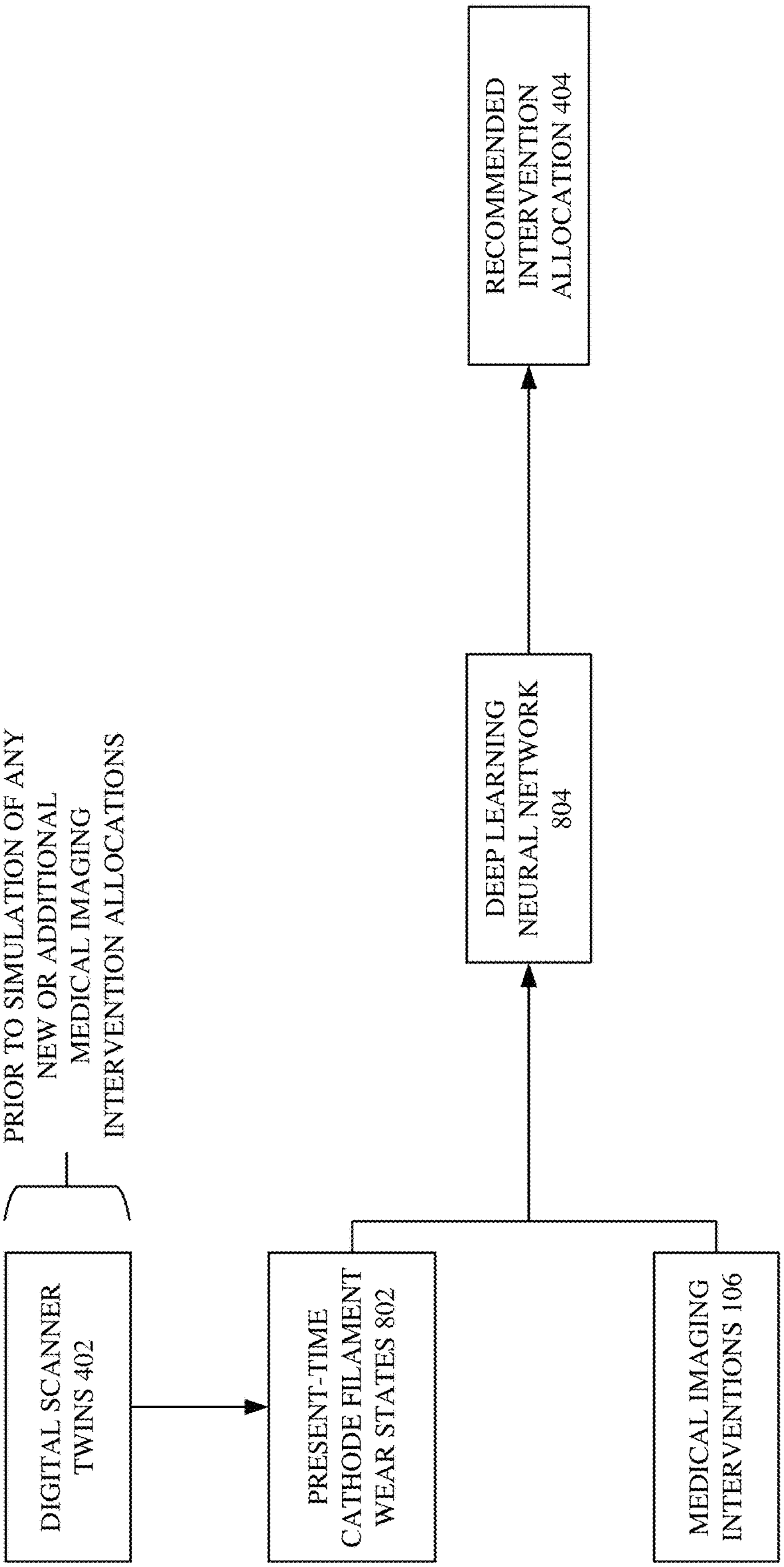
FIGS. 8-9 illustrate example, non-limiting block diagrams showing how a deep learning neural network can be leveraged to generate a recommended intervention allocation in accordance with one or more embodiments described herein.
Figure 9:
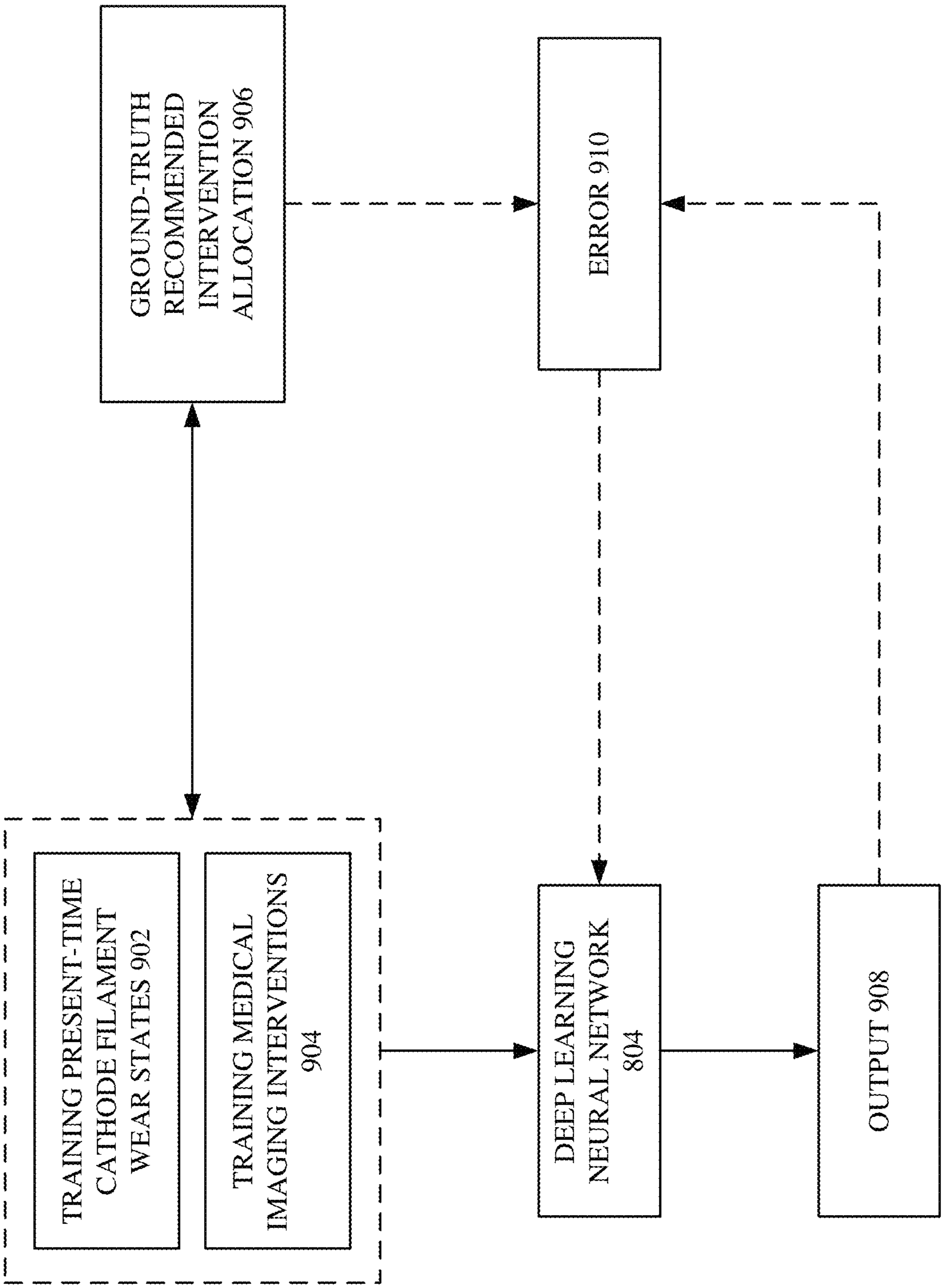

Now, consider FIGS. 8-9. FIGS. 8-9 illustrate example, non-limiting block diagrams showing how a deep learning neural network can be leveraged to generate a recommended intervention allocation in accordance with one or more embodiments described herein.

First, consider FIG. 8. In various embodiments, the allocation component 114 can electronically store, electronically maintain, electronically control, or otherwise electronically access a deep learning neural network 804 (e.g., instead of the optimizer engine 602). In various aspects, the deep learning neural network 804 can be any suitable artificial neural network that can have or otherwise exhibit any suitable internal architecture. For instance, the deep learning neural network 804 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As even another example, any of such input layer, one or more hidden layers, or output layer can be LSTM layers, whose learnable or trainable parameters can be input-state weight matrices or hidden-state weight matrices. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In any case, the deep learning neural network 804 can be configured to intelligently or wisely allocate inputted medical imaging interventions among inputted medical imaging scanners. In particular, as mentioned above, each cathode filament wear model of the plurality of digital scanner twins 402 can, prior to the simulation of any new or additional intervention allocations (e.g., prior to simulation of any of 606), indicate a present-time cathode filament wear state of a respective cathode filament of a respective medical imaging scanner. In the non-limiting examples of the figures, there can be a total of nmp cathode filament wear models in the plurality of digital scanner twins 402. Accordingly, there can thus be a total of nmp present-time cathode filament wear states indicated by the plurality of digital scanner twins 402. In various instances, such nmp present time cathode filament wear states can collectively be referred to as a plurality of present-time cathode filament wear states 802. In other words, the plurality of present-time cathode filament wear states 802 can be any suitable electronic data (e.g., can be one or more scalars, one or more vectors, one or more matrices, one or more tensors, or any suitable combination thereof) that indicates how much wear is or has been already accumulated by each specific cathode filament of each specific one of the plurality of medical imaging scanners 104.

In various cases, the allocation component 114 can electronically execute the deep learning neural network 804 on both the plurality of present-time cathode filament wear states 802 and the set of medical imaging interventions 106, and such execution can cause the deep learning neural network 804 to produce as output the recommended intervention allocation 404. More specifically, the allocation component 114 can concatenate the plurality of present-time cathode filament wear states 802 and the set of medical imaging interventions 106 together. In various aspects, the allocation component 114 can feed such concatenation to an input layer of the deep learning neural network 804. In various instances, such concatenation can complete a forward pass through one or more hidden layers of the deep learning neural network 804. In various cases, an output layer of the deep learning neural network 804 can compute or calculate the recommended intervention allocation 404, based on activation maps or feature maps produced by the one or more hidden layers of the deep learning neural network 804.

In embodiments where the recommended intervention allocation 404 is determined by the deep learning neural network 804, the deep learning neural network 804 can first undergo training, so as to help cause the recommended intervention allocation 404 to be reliable (e.g., to actually help reduce cathode filament waste or increase scanner servicing convenience). In some cases, such training can be facilitated in supervised fashion, as described with respect to FIG. 9.

FIG. 9 illustrates an example, non-limiting block diagram showing how the deep learning neural network 804 can be trained in supervised fashion in accordance with one or more embodiments described herein.

Prior to beginning training, the trainable internal parameters (e.g., weight matrices, bias values, convolutional kernels) of the deep learning neural network 804 can be initialized in any suitable fashion (e.g., via random initialization).

In various aspects, there can be a plurality of training present-time cathode filament wear states 902, and there can also be a set of training medical imaging interventions 904. In various instances, the plurality of training present-time cathode filament wear states 902 and the set of training medical imaging interventions 904 can be considered as corresponding to a ground-truth recommended intervention allocation 906. In various cases, the ground-truth recommended intervention allocation 906 can be considered as being whatever allocation of the set of training medical imaging interventions 904 is known or deemed to be best (e.g., in terms of reducing cathode filament waste or increasing scanner servicing convenience) when given the plurality of training present-time cathode filament wear states 902. In some aspects, the ground-truth recommended intervention allocation 906 can be manually crafted by a subject matter expert. In other aspects, the ground-truth recommended intervention allocation 906 can be generated or determined by the optimizer engine 602.

In any case, the deep learning neural network 804 can be executed on both the plurality of training present-time cathode filament wear states 902 and the set of training medical imaging interventions 904, and such execution can cause the deep learning neural network 804 to produce an output 908. More specifically, the plurality of training present-time cathode filament wear states 902 and the set of training medical imaging interventions 904 can be concatenated together, such concatenation can be fed to an input layer of the deep learning neural network 804, such concatenation can complete a forward pass through one or more hidden layers of the deep learning neural network 804, and an output layer of the deep learning neural network 804 can compute or calculate the output 908, based on activation maps or feature maps produced by the one or more hidden layers of the deep learning neural network 804.

Note that, in various cases, the format, size, or dimensionality of the output 908 can be controlled or otherwise determined by the number, arrangement, or sizes of neurons or of other internal parameters (e.g., convolutional kernels) that are contained in or that otherwise make up the output layer (or any other layers) of the deep learning neural network 804. Thus, the output 908 can be forced to have any desired format, size, or dimensionality by adding, removing, or otherwise adjusting neurons or other internal parameters to, from, or within the output layer (or any other layers) of the deep learning neural network 804. Accordingly, in various aspects, the output 908 can be considered as the predicted or inferred recommended intervention allocation that the deep learning neural network 804 believes should correspond to the plurality of training present-time cathode filament wear states 902 and the set of training medical imaging interventions 904. In contrast, the ground-truth recommended intervention allocation 906 can be the correct or accurate recommended intervention allocation that is known or deemed to correspond to the plurality of training present-time cathode filament wear states 902 and the set of training medical imaging interventions 904. Note that, if the deep learning neural network 804 has so far undergone no or little training, then the output 908 can be highly inaccurate (e.g., can be very different from the ground-truth recommended intervention allocation 906).

In various aspects, an error 910 can be computed between the output 908 and the ground-truth recommended intervention allocation 906. In various instances, any suitable loss or objective function can be used to compute the error 910. As some non-limiting examples, the error 910 can be a mean absolute error, a mean squared error, or a cross-entropy error. In various cases, as shown, the trainable internal parameters of the deep learning neural network 804 can be incrementally updated, by performing backpropagation (e.g., stochastic gradient descent) driven by the error 910.

In various cases, the above-described training procedure can be repeated for any suitable number of times (e.g., for any suitable input-annotation tuples). This can ultimately cause the trainable internal parameters of the deep learning neural network 804 to become iteratively optimized for accurately allocating inputted medical imaging interventions across the plurality of medical imaging scanners 104 so as to reduce cathode filament waste or increase scanner servicing convenience. In various aspects, any suitable training batch sizes or any suitable training termination criteria can be implemented.

Although the above discussion mainly pertains to training the deep learning neural network 804 in supervised fashion, this is a mere non-limiting example for ease of explanation. In various instances, any other suitable training paradigm can be implemented to train the deep learning neural network 804, such as unsupervised training or reinforcement learning.

Note that, in various embodiments, any other suitable machine learning architecture of artificial intelligence architecture can be implemented in place of the deep learning neural network 804. Some non-limiting examples can include: support vector machines; naïve Bayes models; linear regression models; logistic regression models; decision tree models; or random forest models.

In any case, the allocation component 114 can electronically determine the recommended intervention allocation 404, by leveraging the plurality of digital scanner twins 402.

Note that, in some cases, the allocation component 114 can update the present-time cathode filament wear states (e.g., 802) that are indicated by the plurality of digital scanner twins 402, based on the recommended intervention allocation 404. As a non-limiting example, whatever simulated cathode filament wear states are computed or forecasted by the plurality of digital scanner 402 for the recommended intervention allocation 404 can be treated as the new present-time cathode filament wear states during future simulations.

In various embodiments, the result component 116 can electronically perform or initiate any suitable actions, based on the recommended intervention allocation 404.

As a non-limiting example, the result component 116 can electronically transmit the recommended intervention allocation 404 to any suitable computing device.

As another non-limiting example, the result component 116 can electronically render the recommended intervention allocation 404 on any suitable electronic display (e.g., on any suitable computer screen, on any suitable computer monitor). In some instances, the result component 116 can electronically render on the electronic display any other suitable information pertaining to the recommended intervention allocation 404, such as: estimated wear accumulated by any given cathode filament of any given medical imaging scanner; estimated time until maintenance (e.g., X-ray tube replacement) for any given medical imaging scanner; or estimated time until performance of an allocated medical imaging intervention for any given medical imaging scanner.

As yet another non-limiting example, the result component 116 can electronically cause the set of medical imaging interventions 106 to be allocated among the plurality of medical imaging scanners 104 in accordance with the recommended allocation 404. For instance, the result component 116 can electronically transmit the recommended allocation 404 to any suitable scheduling system that governs the plurality of medical imaging scanners 104. In such cases, each of the plurality of medical imaging scanners 104 can independently communicate with the scheduling system so as to identify whichever of the set of medical imaging interventions 106 are allocated to it according to the recommended intervention allocation 404. In other instances, however, the result component 116 can instead directly electronically instruct each of the plurality of medical imaging scanners 104 to commit (e.g., via a local scanning protocol commit operation) or otherwise prepare itself (e.g., via automated scanner initialization) for whichever of the set of medical imaging interventions 106 is assigned or allocated to it according to the recommended intervention allocation 404.

Furthermore, note that, although various embodiments have mainly been described in which the plurality of digital scanner twins 402 simulate or forecast wear accumulated by cathode filaments of the plurality of medical imaging scanners 104, this is a mere non-limiting example for ease of explanation and illustration. In various other embodiments, the plurality of digital scanner twins 402 can simulate or forecast the wear accumulated by any other suitable components or parts of any of the plurality of medical imaging scanners 104. As some non-limiting examples, the plurality of digital scanner twins 402 can simulate or forecast the wear accumulated by: any suitable gantry motors of the plurality of medical imaging scanners 104 (e.g., in such case, a digital twin can include gantry motor wear models); any suitable table actuators of the plurality of medical imaging scanners 104 (e.g., in such case, a digital twin can include table actuator wear models); any suitable signal brushes of the plurality of medical imaging scanners 104 (e.g., in such case, a digital twin can include signal brush wear models); or any suitable power brushes of the plurality of medical imaging scanners 104 (e.g., in such case, a digital twin can include power brush wear models).

Figure 10:
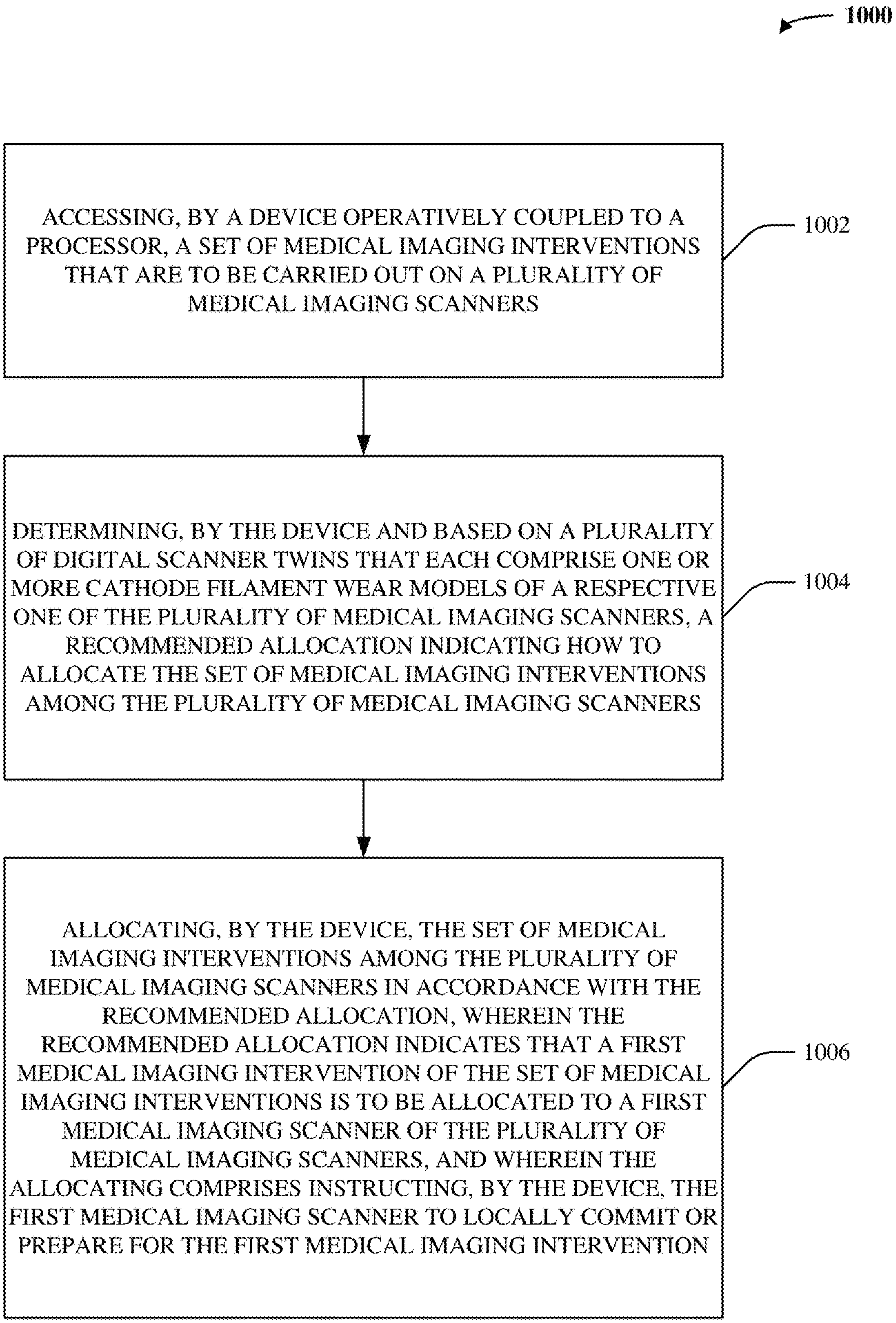
FIG. 10 illustrates a flow diagram of an example, non-limiting computer-implemented method that facilitates intelligent intervention allocation for medical imaging scanners in accordance with one or more embodiments described herein.

FIG. 10 illustrates a flow diagram of an example, non-limiting computer-implemented method 1000 that can facilitate intelligent intervention allocation for medical imaging scanners in accordance with one or more embodiments described herein. In some cases, the scanner wear system 102 can facilitate the computer-implemented method 1000.

In various embodiments, act 1002 can include accessing, by a device (e.g., via 112) operatively coupled to a processor (e.g., 108), a set of medical imaging interventions (e.g., 106) that are to be carried out on a plurality of medical imaging scanners (e.g., 104).

In various aspects, act 1004 can include determining, by the device (e.g., via 114) and based on a plurality of digital scanner twins (e.g., 402) that each comprise one or more cathode filament wear models (e.g., 402(1)(1), **402(1)(*m*); 402(*n*)(1); 402(*n*)(*m*)) of a respective one of the plurality of medical imaging scanners, a recommended allocation (e.g., 404**) indicating how to allocate the set of medical imaging interventions among the plurality of medical imaging scanners.

In various instances, act 1006 can include allocating, by the device (e.g., via 116), the set of medical imaging interventions among the plurality of medical imaging scanners in accordance with the recommended allocation, wherein the recommended allocation can indicate that a first medical imaging intervention (e.g., any one of 106) of the set of medical imaging interventions is to be allocated to a first medical imaging scanner (e.g., any one of 104) of the plurality of medical imaging scanners, and wherein the allocating can comprise instructing, by the device (e.g., via 116), the first medical imaging scanner to locally commit or prepare for the first medical imaging intervention.

Although not explicitly shown in FIG. 10, the device can simulate, on the plurality of digital scanner twins, multiple different allocations (e.g., 606) of the set of medical imaging interventions among the plurality of medical imaging scanners, and the recommended allocation can be whichever of those multiple different allocations causes an aggregate intra-scanner cathode filament wear discrepancy (e.g., 604) indicated by the plurality of digital scanner twins to be minimized.

Although not explicitly shown in FIG. 10, the device can simulate, on the plurality of digital scanner twins, multiple different allocations (e.g., 606) of the set of medical imaging interventions among the plurality of medical imaging scanners, and the recommended allocation can be whichever of those multiple different allocations causes an aggregate inter-scanner cathode filament wear discrepancy (e.g., 604) indicated by the plurality of digital scanner twins to be maximized.

Although not explicitly shown in FIG. 10, the device can simulate, on the plurality of digital scanner twins, multiple different allocations (e.g., 606) of the set of medical imaging interventions among the plurality of medical imaging scanners, and the recommended allocation can be whichever of those multiple different allocations causes an aggregate intra-location cathode filament wear discrepancy (e.g., 604) indicated by the plurality of digital scanner twins to be minimized.

Although not explicitly shown in FIG. 10, the device can determine the recommended allocation, by executing a machine learning model (e.g., 804) on the set of medical imaging interventions and on present-time cathode filament wear states (e.g., 802) indicated by the plurality of digital scanner twins.

Although not explicitly shown in FIG. 10, each of the plurality of digital scanner twins can further comprise: one or more gantry motor wear models of a respective one of the plurality of medical imaging scanners; one or more signal brush wear models of a respective one of the plurality of medical imaging scanners; or one or more power brush wear models of a respective one of the plurality of medical imaging scanners.

Although not explicitly shown in FIG. 10, each medical imaging intervention can indicate a respective medical imaging protocol (e.g., 106(1)(1)) to be performed on a respective medical patient and can indicate physical characteristics (e.g., 106(1)(2)) of the respective medical patient.

Although the herein disclosure mainly describes each of the set of medical imaging interventions 106 as being executable, performable, or implementable by any of the plurality of medical imaging scanners 104, this is a mere non-limiting example for ease of explanation and illustration. In various cases, any of the set of medical imaging interventions 106 can be executable, performable, or implementable by fewer than all of the plurality of medical imaging scanners 104. For instance, any given medical imaging intervention can be subject to various requirements that are satisfied by fewer than all of the plurality of medical imaging scanners 104. As a non-limiting example, some particular medical imaging interventions can be implemented only by some particular medical imaging scanners (e.g., lower extremity scanning protocols can be performed only by lower extremity CT scanners; a scan that is to be performed on a patient in a particular intensive care unit can be performed only by a scanner that is near that particular intensive care unit). As another non-limiting example, some particular patient characteristics can require particular medical imaging scanners (e.g., scanning protocols to be performed on obese patients can require wide-bore CT scanners having high-capacity cradles). It is to be understood that various embodiments described herein can take into account such additional intervention requirements, so as to allocate any given medical imaging intervention only to a respective medical imaging scanner that satisfies such additional intervention requirements (e.g., so as to avoid allocating the given intervention to an incompatible scanner).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 11:
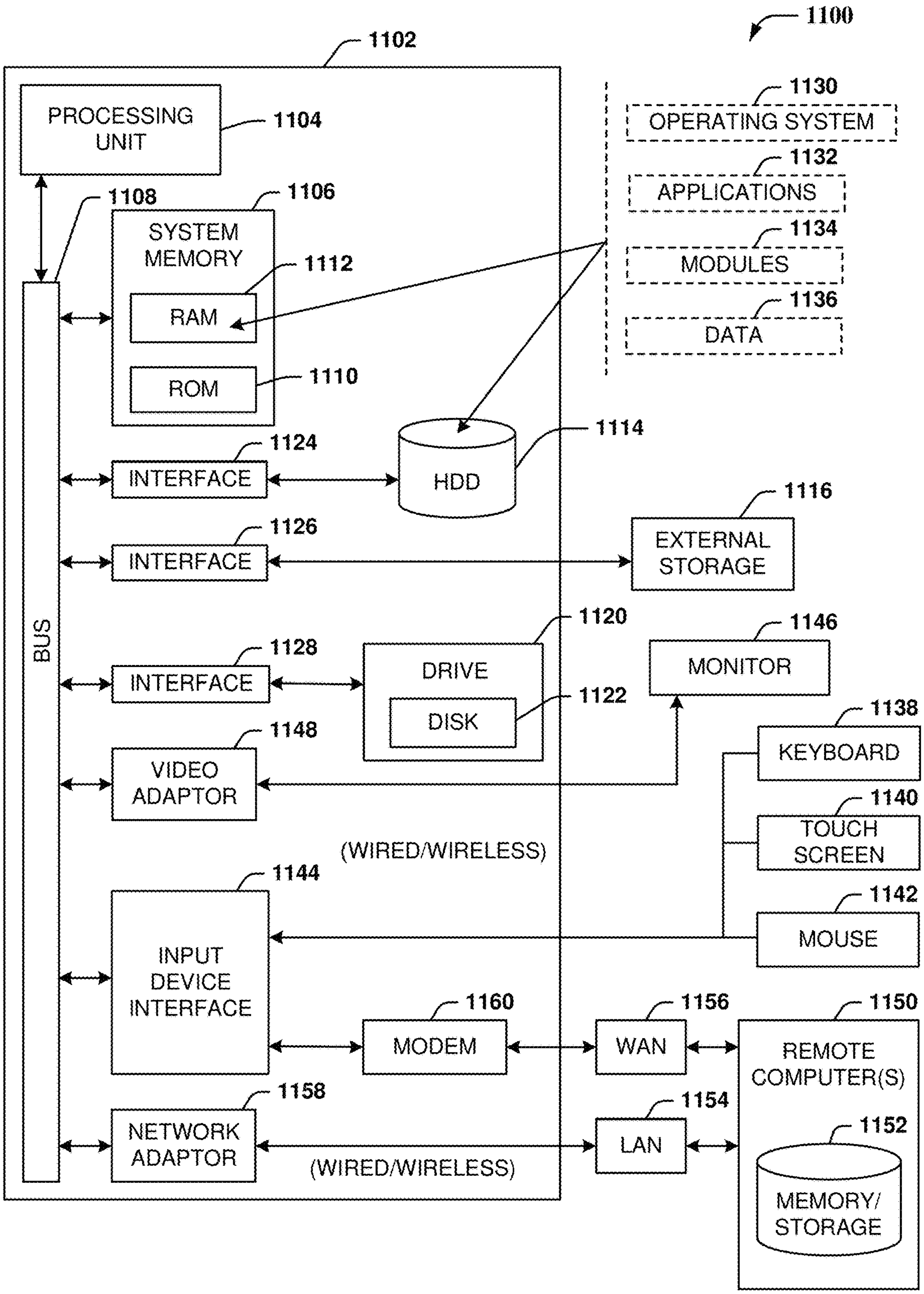
FIG. 11 illustrates a block diagram of an example, non-limiting operating environment in which one or more embodiments described herein can be facilitated.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid state drive, an optical disk drive, which can read or write from a disk 1122, such as a CD-ROM disc, a DVD, a BD, etc. Alternatively, where a solid state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above, such as but not limited to a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
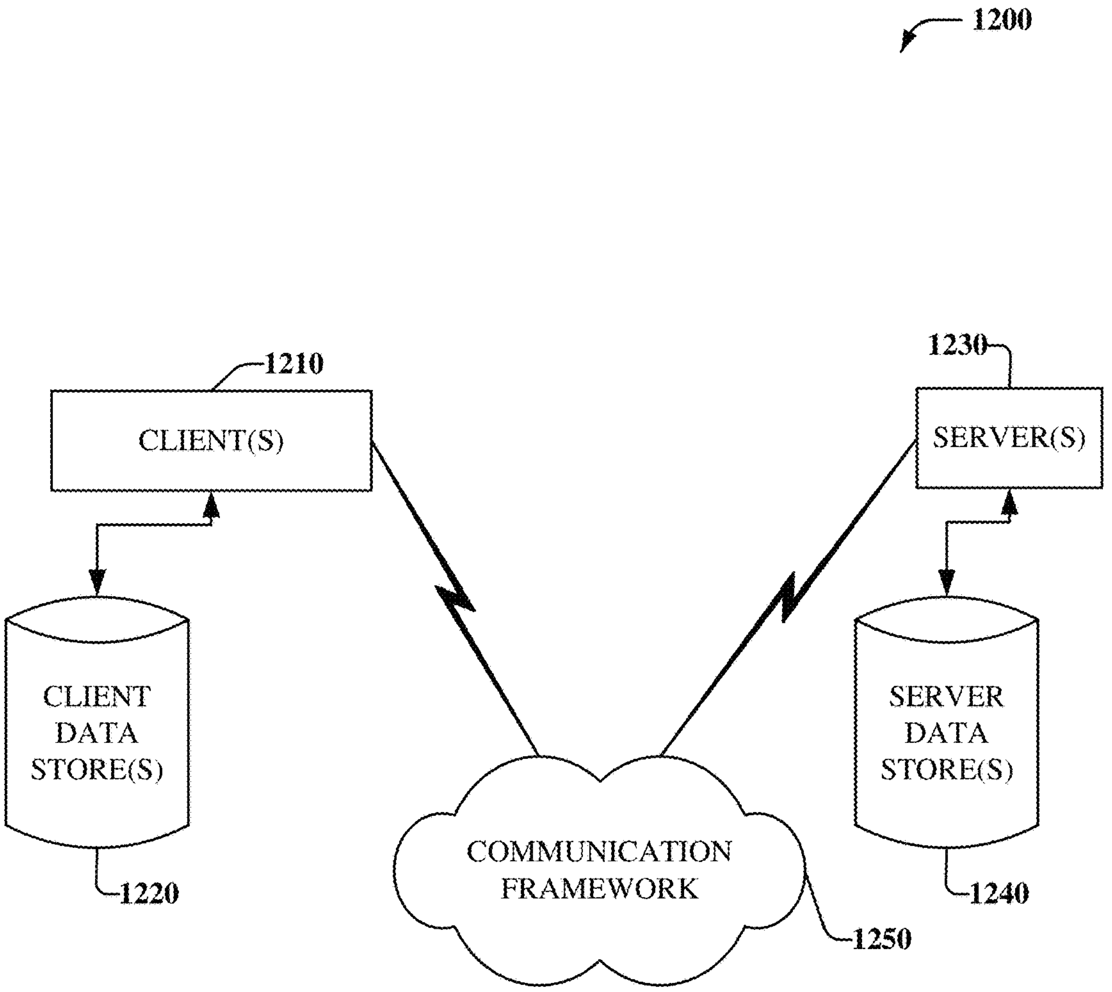
FIG. 12 illustrates an example networking environment operable to execute various implementations described herein.

FIG. 12 is a schematic block diagram of a sample computing environment 1200 with which the disclosed subject matter can interact. The sample computing environment 1200 includes one or more client(s) 1210. The client(s) 1210 can be hardware or software (e.g., threads, processes, computing devices). The sample computing environment 1200 also includes one or more server(s) 1230. The server(s) 1230 can also be hardware or software (e.g., threads, processes, computing devices). The servers 1230 can house threads to perform transformations by employing one or more embodiments as described herein, for example. One possible communication between a client 1210 and a server 1230 can be in the form of a data packet adapted to be transmitted between two or more computer processes. The sample computing environment 1200 includes a communication framework 1250 that can be employed to facilitate communications between the client(s) 1210 and the server(s) 1230. The client(s) 1210 are operably connected to one or more client data store(s) 1220 that can be employed to store information local to the client(s) 1210. Similarly, the server(s) 1230 are operably connected to one or more server data store(s) 1240 that can be employed to store information local to the servers 1230.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a non-transitory computer-readable memory, wherein the computer-executable components comprise:

an access component that accesses a set of medical imaging interventions that are to be carried out on a plurality of medical imaging scanners;

an allocation component that determines, based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners; and a result component that allocates the set of medical imaging interventions among the plurality of medical imaging scanners in accordance with the recommended allocation, wherein the recommended allocation indicates that a first medical imaging intervention of the set of medical imaging interventions is to be allocated to a first medical imaging scanner of the plurality of medical imaging scanners, and wherein the result component instructs the first medical imaging scanner to locally commit or prepare for the first medical imaging intervention.

2. The system of claim 1, wherein the allocation component simulates, on the plurality of digital scanner twins, multiple different allocations of the set of medical imaging interventions among the plurality of medical imaging scanners, and wherein the recommended allocation is whichever of those multiple different allocations causes an aggregate intra-scanner cathode filament wear discrepancy indicated by the plurality of digital scanner twins to be minimized.

3. The system of claim 1, wherein the allocation component simulates, on the plurality of digital scanner twins, multiple different allocations of the set of medical imaging interventions among the plurality of medical imaging scanners, and wherein the recommended allocation is whichever of those multiple different allocations causes an aggregate inter-scanner cathode filament wear discrepancy indicated by the plurality of digital scanner twins to be maximized.

4. The system of claim 1, wherein the allocation component simulates, on the plurality of digital scanner twins, multiple different allocations of the set of medical imaging interventions among the plurality of medical imaging scanners, and wherein the recommended allocation is whichever of those multiple different allocations causes an aggregate intra-location cathode filament wear discrepancy indicated by the plurality of digital scanner twins to be minimized.

5. The system of claim 1, wherein the allocation component determines the recommended allocation, by executing a machine learning model on the set of medical imaging interventions and on present-time cathode filament wear states indicated by the plurality of digital scanner twins.

6. The system of claim 1, wherein each of the plurality of digital scanner twins further comprises:

one or more gantry motor wear models of a respective one of the plurality of medical imaging scanners;

one or more signal brush wear models of a respective one of the plurality of medical imaging scanners; or one or more power brush wear models of a respective one of the plurality of medical imaging scanners.

7. The system of claim 1, wherein each medical imaging intervention indicates a respective medical imaging protocol to be performed on a respective medical patient and indicates physical characteristics of the respective medical patient.

8. A computer-implemented method, comprising:

accessing, by a device operatively coupled to a processor, a set of medical imaging interventions that are to be carried out on a plurality of medical imaging scanners;

determining, by the device and based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners; and allocating, by the device, the set of medical imaging interventions among the plurality of medical imaging scanners in accordance with the recommended allocation, wherein the recommended allocation indicates that a first medical imaging intervention of the set of medical imaging interventions is to be allocated to a first medical imaging scanner of the plurality of medical imaging scanners, and wherein the allocating comprises instructing, by the device, the first medical imaging scanner to locally commit or prepare for the first medical imaging intervention.

9. The computer-implemented method of claim 8, wherein the device simulates, on the plurality of digital scanner twins, multiple different allocations of the set of medical imaging interventions among the plurality of medical imaging scanners, and wherein the recommended allocation is whichever of those multiple different allocations causes an aggregate intra-scanner cathode filament wear discrepancy indicated by the plurality of digital scanner twins to be minimized.

10. The computer-implemented method of claim 8, wherein the device simulates, on the plurality of digital scanner twins, multiple different allocations of the set of medical imaging interventions among the plurality of medical imaging scanners, and wherein the recommended allocation is whichever of those multiple different allocations causes an aggregate inter-scanner cathode filament wear discrepancy indicated by the plurality of digital scanner twins to be maximized.

11. The computer-implemented method of claim 8, wherein the device simulates, on the plurality of digital scanner twins, multiple different allocations of the set of medical imaging interventions among the plurality of medical imaging scanners, and wherein the recommended allocation is whichever of those multiple different allocations causes an aggregate intra-location cathode filament wear discrepancy indicated by the plurality of digital scanner twins to be minimized.

12. The computer-implemented method of claim 8, wherein the device determines the recommended allocation, by executing a machine learning model on the set of medical imaging interventions and on present-time cathode filament wear states indicated by the plurality of digital scanner twins.

13. The computer-implemented method of claim 8, wherein each of the plurality of digital scanner twins further comprises:

one or more gantry motor wear models of a respective one of the plurality of medical imaging scanners;

one or more signal brush wear models of a respective one of the plurality of medical imaging scanners; or one or more power brush wear models of a respective one of the plurality of medical imaging scanners.

14. The computer-implemented method of claim 8, wherein each medical imaging intervention indicates a respective medical imaging protocol to be performed on a respective medical patient and indicates physical characteristics of the respective medical patient.

15. A computer program product for facilitating intelligent intervention allocation for medical imaging scanners, the computer program product comprising a non-transitory computer-readable memory having program instructions embodied therewith, the program instructions executable by a processor to cause the processor to:

access a set of medical imaging interventions that are to be carried out on a plurality of medical imaging scanners;

determine, based on a plurality of digital scanner twins that each comprise one or more cathode filament wear models of a respective one of the plurality of medical imaging scanners, a recommended allocation indicating how to allocate the set of medical imaging interventions among the plurality of medical imaging scanners; and allocate the set of medical imaging interventions among the plurality of medical imaging scanners in accordance with the recommended allocation, wherein the recommended allocation indicates that a first medical imaging intervention of the set of medical imaging interventions is to be allocated to a first medical imaging scanner of the plurality of medical imaging scanners, and wherein the processor instructs the first medical imaging scanner to locally commit or prepare for the first medical imaging intervention.

16. The computer program product of claim 15, wherein the processor simulates, on the plurality of digital scanner twins, multiple different allocations of the set of medical imaging interventions among the plurality of medical imaging scanners, and wherein the recommended allocation is whichever of those multiple different allocations causes an aggregate intra-scanner cathode filament wear discrepancy indicated by the plurality of digital scanner twins to be minimized.

17. The computer program product of claim 15, wherein the processor simulates, on the plurality of digital scanner twins, multiple different allocations of the set of medical imaging interventions among the plurality of medical imaging scanners, and wherein the recommended allocation is whichever of those multiple different allocations causes an aggregate inter-scanner cathode filament wear discrepancy indicated by the plurality of digital scanner twins to be maximized.

18. The computer program product of claim 15, wherein the processor simulates, on the plurality of digital scanner twins, multiple different allocations of the set of medical imaging interventions among the plurality of medical imaging scanners, and wherein the recommended allocation is whichever of those multiple different allocations causes an aggregate intra-location cathode filament wear discrepancy indicated by the plurality of digital scanner twins to be minimized.

19. The computer program product of claim 15, wherein the processor determines the recommended allocation, by executing a machine learning model on the set of medical imaging interventions and on present-time cathode filament wear states indicated by the plurality of digital scanner twins.

20. The computer program product of claim 15, wherein each of the plurality of digital scanner twins further comprises:

one or more gantry motor wear models of a respective one of the plurality of medical imaging scanners;

one or more signal brush wear models of a respective one of the plurality of medical imaging scanners; or one or more power brush wear models of a respective one of the plurality of medical imaging scanners.

* * * * *